US010151607B2

(12) United States Patent
Lustbader et al.

(10) Patent No.: US 10,151,607 B2
(45) Date of Patent: Dec. 11, 2018

(54) SHIELD DEVICES, SYSTEMS, AND METHODS FOR IMPROVED MEASUREMENTS AND DETECTION

(71) Applicant: Alliance for Sustainable Energy, LLC, Golden, CO (US)

(72) Inventors: Jason A. Lustbader, Boulder, CO (US); Cory James Kreutzer, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 8 days.

(21) Appl. No.: 15/442,367

(22) Filed: Feb. 24, 2017

(65) Prior Publication Data
US 2017/0248450 A1 Aug. 31, 2017

Related U.S. Application Data

(60) Provisional application No. 62/300,135, filed on Feb. 26, 2016.

(51) Int. Cl.
*G01D 11/24* (2006.01)
(52) U.S. Cl.
CPC .................................. *G01D 11/245* (2013.01)
(58) Field of Classification Search
CPC .................................................... G01D 11/245
USPC ......... 250/505.1, 506.1, 515.1, 517.1, 518.1, 250/519.1
See application file for complete search history.

(56) References Cited

U.S. PATENT DOCUMENTS

| 3,834,237 A | 9/1974 | Robertson |
| 4,511,264 A | 4/1985 | Bucha et al. |
| 5,165,793 A | 11/1992 | Rall et al. |
| 6,541,737 B1 | 4/2003 | Eksin et al. |
| 7,621,672 B2 | 11/2009 | Ripley |
| 8,834,019 B2 | 9/2014 | Fraden |
| 2013/0153769 A1* | 6/2013 | Singer ...................... G01J 5/04 250/338.1 |
| 2014/0077105 A1* | 3/2014 | Kawahara ............... G21F 5/015 250/507.1 |

FOREIGN PATENT DOCUMENTS

| EP | 0 274 077 B1 | 7/1988 |
| EP | 0 214 294 B1 | 12/1992 |
| EP | 1 602 905 B1 | 12/2005 |
| JP | 60-170731 | 9/1985 |

* cited by examiner

*Primary Examiner* — Nicole Ippolito
(74) *Attorney, Agent, or Firm* — Alexandra M. Hall; Michael A. McIntyre

(57) ABSTRACT

The present disclosure relates to a device having a first wall that includes a first opening having a first edge, and a first aperture through the first wall. The first edge may be positioned at least partially within a first plane, the first wall and the first plane may define a first space positioned within the first wall, and the first aperture may have a second edge with at least a portion of the second edge positioned outside of the first plane. The device may be utilized to shield one or more sensors from radiation, to insure measurements made by the one or more sensors more accurately represent the actual environmental conditions.

21 Claims, 19 Drawing Sheets

SHIELD DEVICES, SYSTEMS, AND METHODS FOR IMPROVED MEASUREMENTS AND DETECTION

CROSS-REFERENCE TO RELATED APPLICATIONS

This application claims priority to U.S. Provisional Application No. 62/300,135 filed Feb. 26, 2016, the contents of which are incorporated herein by reference in its entirety.

CONTRACTUAL ORIGIN

The United States Government has rights in this disclosure under Contract No. DE-AC36-08GO28308 between the United States Department of Energy and the Alliance for Sustainable Energy, LLC, the Manager and Operator of the National Renewable Energy Laboratory.

BACKGROUND

Local environmental measurements, including temperature, pressure, and humidity, are commonly made in both indoor and outdoor environments such as in transportation and building applications. The accuracy and reliability of such measurements may be adversely affected by electromagnetic radiation, especially when direct or indirect solar radiation strikes the sensors recording the measurements. Thus, obtaining accurate and reliable measurements of surface temperature and/or air temperatures can be particularly difficult. Commercial radiation shields have traditionally focused on weather station air temperature measurements and commonly use baffle based designs. These baffle type designs are not appropriate for local temperature measurements performed on surfaces and/or in transportation applications and can also be cost prohibitive. Other designs can be time consuming to implement, may only be appropriate for research applications, and cannot be used for surface temperature measurement. Thus, there clearly remains a need for devices, systems, and methods that improve the accuracy and reliability of both indoor and outdoor environmental measurements.

SUMMARY

An aspect of the present disclosure is a device that includes a first wall having a first opening having a first edge, with a first aperture passing through the first wall, where the first edge is positioned at least partially within a first plane, the first wall and the first plane define a first space positioned within the first wall, and the first aperture has a second edge with at least a portion of the second edge positioned outside of the first plane. In some embodiments of the present disclosure, the device may also include a second wall having a second opening having a third edge, with a second aperture passing through the second wall, where the third edge may be positioned at least partially within the first plane or in a second plane substantially parallel to the first plane. The second wall and the first plane or the second plane may define a second space positioned within the second wall, the second wall may be positioned within the first space to form a third space between the first wall and the second wall, the second aperture may have a fourth edge with at least a portion of the fourth edge positioned outside of the first plane or the second plane, and the first aperture and the second aperture may be positioned to minimize the transfer of radiation into the second space.

In some embodiments of the present disclosure, the first wall may be substantially in a shape such as a hemisphere, an ellipsoid, a cylinder, a cone, a pyramid, and/or a cuboid. The second wall may be substantially in a shape such as a hemisphere, an ellipsoid, a cylinder, a cone, a pyramid, and/or a cuboid. The first opening may be substantially in a shape such as a circle, a semicircle, an oval, an ellipse, a triangle, a square, a rectangle, and/or a polygon. The second opening may be substantially in a shape such as a circle, a semicircle, an oval, an ellipse, a triangle, a square, a rectangle, and/or a polygon. The first aperture may be substantially in a shape such as at least one of at least a portion of a circle, a semicircle, an oval, an ellipse, a triangle, a square, a rectangle, a parabolic shape, and/or a polygon. The second aperture may be substantially in a shape such as at least one of at least a portion of a circle, a semicircle, an oval, an ellipse, a triangle, a square, a rectangle, a parabolic shape, and/or a polygon.

In some embodiments of the present disclosure, the second edge may intersect the first plane. The first aperture may be substantially in a shape such as at least one of a circle, a semicircle, an oval, an ellipse, a triangle, a square, a rectangle, a parabolic shape, and/or a polygon. The third edge may intersect the first plane and/or the second plane. The first wall may have a first outer surface that includes a first material that substantially reflects radiation. The first wall may have a first inner surface that includes a second material that substantially absorbs radiation.

In some embodiments of the present disclosure, at least one of the first material and/or second material may substantially absorb and/or reflect radiation having a wavelength of about 200 nm to about 2500 nm. The second wall may have a second outer surface that includes a third material that substantially reflects radiation. The second wall may have a second inner surface that includes a fourth material that substantially absorbs radiation having a wavelength from about 700 nm to about 1 mm. In some embodiments of the present disclosure, at least one of the third material and/or fourth material may substantially absorb and/or reflect radiation that includes at least one of visible light and/or infrared light.

In some embodiments of the present disclosure, the device may include a first ratio, where the first wall may have a first total surface area, the first aperture may have a first open surface area, and the first ratio may be defined by the first open surface area divided by the first total surface area. In some embodiments of the present disclosure, the device may include a second ratio, where the second wall may have a second total surface area, the second aperture may have a second open surface area, and the second ratio may be defined by the second open surface area divided by the second total surface area. The first aperture may be positioned in a first portion of the first wall relative to an axis perpendicular to the first plane, and the first portion may not exceed a first height relative to the first plane. The first aperture may be positioned in a second portion of the second wall relative to the axis perpendicular to the first plane, and the second portion may be positioned below the first height relative to the first plane.

An aspect of the present disclosure is a method that includes identifying a measurement location on a surface, cleaning the measurement location, assembling a radiation as described herein, positioning a thermocouple within the radiation shield, positioning the thermocouple and the radiation shield onto the cleaned location, and bonding the thermocouple with the radiation shield to the cleaned location. A further aspect of the present disclosure is a method that includes forming an internal volume by positioning an outer wall around an inner wall, controlling radiant heat transfer into the internal volume, minimizing reflection of radiation within the internal volume, and controlling convective heat transfer between the internal volume and an external environment. The controlling of radiant heat transfer and the controlling of convective heat transfer may be accomplished by varying at least one of the number, shape, or position of a plurality of apertures positioned with the outer wall and the inner wall. The minimizing of the reflection of radiation may be performed by providing a light-absorbing coating to an inside surface of at least one of the outer wall or the inner wall, and the controlling of the radiant heat transfer may be controlled by providing a light-reflective coating to an outside surface of at least one of the inner wall or the outer wall.

BRIEF DESCRIPTION OF THE DRAWINGS

Exemplary embodiments are illustrated in referenced figures of the drawings. It is intended that the embodiments and figures disclosed herein are to be considered illustrative rather than limiting.

REFERENCE NUMBERS

Figure 1:
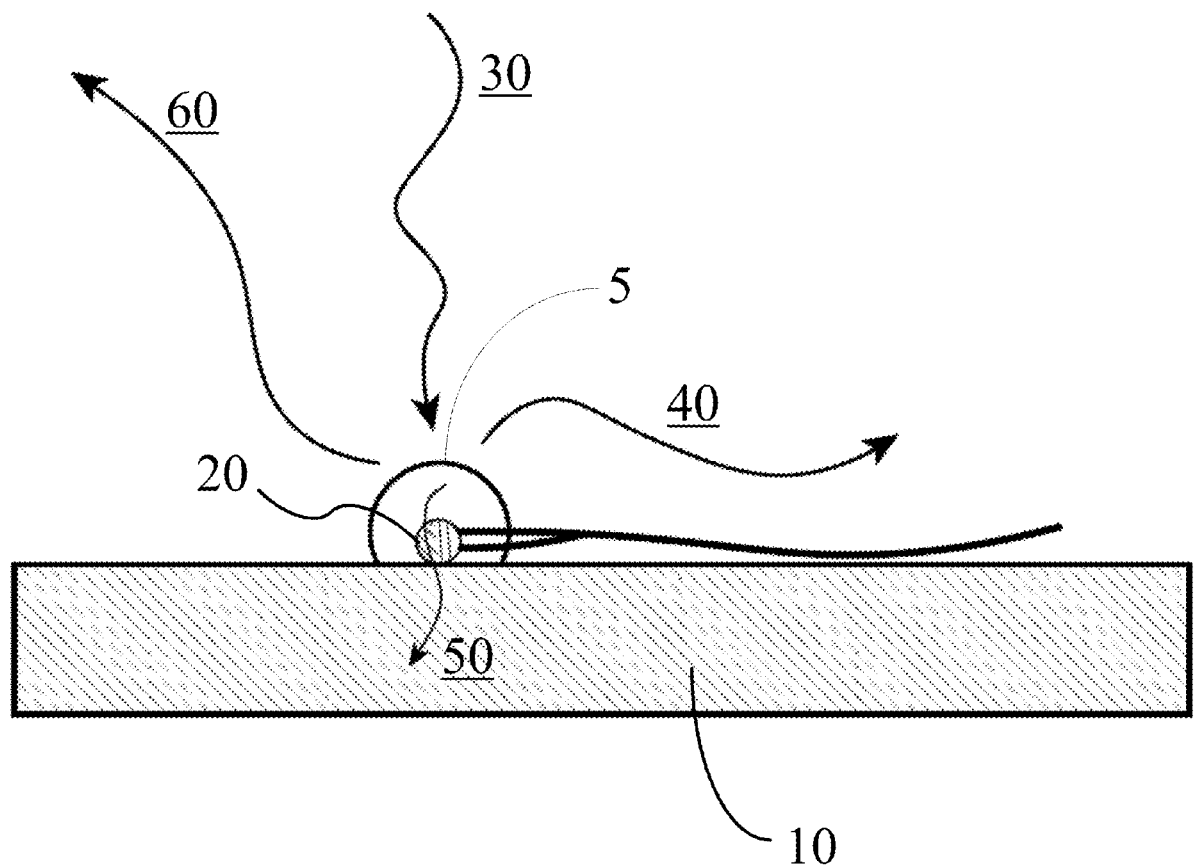
FIG. 1 illustrates heat transfer mechanisms involved in acquiring accurate surface temperature measurements.

5 . . . radiation shield
10 . . . windshield
20 . . . thermocouple
30 . . . radiation in
40 . . . convection out
50 . . . conduction out
60 . . . radiation out
100 . . . shield
105 . . . sensor
110 . . . first wall
120 . . . radiation
130 . . . first space
140 . . . first opening
150 . . . first edge
160 . . . first plane
170 . . . first aperture
180 . . . second edge
200 . . . shield
210 . . . second wall
230 . . . second space
240 . . . second opening
250 . . . third edge
270 . . . second aperture
280 . . . fourth edge
290 . . . intervening space
300 . . . sensor
310 . . . alignment tab
320 . . . alignment marker
330 . . . hinge tab
340 . . . hinge
350 . . . locking tab
400 . . . hole
410 . . . push element
420 . . . second plane
430 . . . shield system
440 . . . slab
500 . . . locking mechanism
505 . . . hanging element
510 . . . clasp
520 . . . first side
530 . . . second side
540 . . . connecting element
550 . . . gap
600 . . . rod
610 . . . clasp
620 . . . catch
630 . . . lip
1000 . . . vehicle
1010 . . . windshield
1020 . . . sensor wiring
1400 . . . method 1410 . . . identify
1420 . . . clean
1430 . . . assemble
1440 . . . position

DETAILED DESCRIPTION

The present disclosure relates to radiation shields that improve the quality and reliability of measurements made by sensors utilizing these radiation shields. Among other things, these improvements to measurement quality (e.g. reduced error, better accuracy, and improved repeatability) are attributable to more effective blockage of the solar radiation, regardless of the solar angle and/or orientation of the shield within its local environment. The shield designs described herein improve the quality of measurements made of either opaque and/or transparent surface temperatures in addition to air temperature measurements. In addition, the shields described herein may provide a cost-effective solution for measuring indoor and/or outdoor temperatures An example surface temperature measurement is provided in the FIG. 1. In this example, a thermocouple 20 is created at the junction of two wires and that junction is subsequently bonded to a surface such as a windshield 10 or other glass object with a material such as a thermally conductive epoxy adhesive. Ideally this thermocouple 20 measures the surface temperature of the glass/windshield 10 itself, however the surrounding environment is disrupted by the measurement device, causing the thermocouple 20 to measure a temperature different then the glass surface. The magnitude of this difference is highly dependent on the thermal environment. By placing a measurement device on the surface to be measured, the various heat transfer mechanisms at that site are disrupted; e.g. radiation in 30, radiation out 60, convection out 40, conduction out 50. One of the most significant causes of error—the difference between the true glass temperature and the measured thermocouple 20 temperature, is caused by the radiation in 30 being absorbed onto the surface of the thermocouple 20 itself. This solar radiation in 30 artificially increases the temperature of the thermocouple 20 above that of the glass surface thereby causing an overestimation of the temperature of the glass surface. By surrounding the measurement with a radiation shield (see reference numeral 5 of FIG. 1), the error caused by the radiation in 30 is minimized. However, a solid surface radiation shield 5 is not a plausible solution because it will further disrupt convective and radiative heat transfer between the surface and the surrounding environment. For instance, a single surface radiation shield 5 blocks all of the radiation in 30 striking the surface below the radiation shield 5. If the radiation shield 5 is large and depending on the material properties of the surface to be measured, the blocked solar radiation (not shown) could artificially lower the temperature of the original surface. In addition, the single surface radiation shield 5 could act as a heat trap and prevent convective heat transfer away from the surface; e.g. convection out 40. Therefore, a porous patterned radiation shield is desirable. However, due to the need to block all solar angles, two concentric porous shields are preferable in order block all direct radiation in 30 to the sensor while preventing the formation of a heat trap within the internal volume formed by the shields. Having a second shield also reduced the direct radiation on the inner shield. This further reduces inner shield heating, which can cause local sensor heating. If two shields are employed, the hole patterns for each shield and shield-to-shield spacing designs are important in order to ensure proper air flow between the two shields and the inner shield and target surface, otherwise overheating will occur. The hole sizing, spacing, and shield-to-shield spacing should be sufficiently large so that natural and/or forced (wind, etc.) convection (e.g. both convection in (not shown) and convection out 40) can occur and prevent heat accumulation. However, as the radiation shield system size increases, its impact on disrupting the overall radiation heat transfer to the surface increases. Therefore, an optimum size for the shield system exists where the shield system remains as small as possible while still providing adequate ventilation. In addition, to further minimize the radiation in 30, onto the sensor, the outer surfaces of both radiation shields may be reflective while the inner surfaces may be absorbing. The outer radiation shield therefore reflects as much of the radiation in 30 as possible, and the remaining radiation in 30 that passes unimpeded into the internal volume of the inner radiation shield may then be reflected onto the inner surfaces of the outer shield where it is absorbed by these inner surfaces of the outer shield, and the energy absorbed is subsequently dissipated; e.g. convection out 40.

In addition to disruption of convection and radiation heat transfer from the placement of the thermocouple 20 on the surface, the difference between the measurement and the true surface temperature is also dependent on the conduction pathway between the two locations. If, for example the thermocouple 20 is not bonded strongly to the surface, or a large amount of epoxy material exists between the thermocouple 20 junction point and the surface, than a large thermal difference between the two points may occur, increasing the measurement error. In order to mitigate this error, during installation the sensor should be adequately pressed to the surface with a radiation shield assembly in order to ensure proper contact and bonding. The accompanying components described herein provide a mechanism to press the thermocouple 20 junction firmly to the target surface while securing the thermocouple 20 in place during use.

Figure 2:
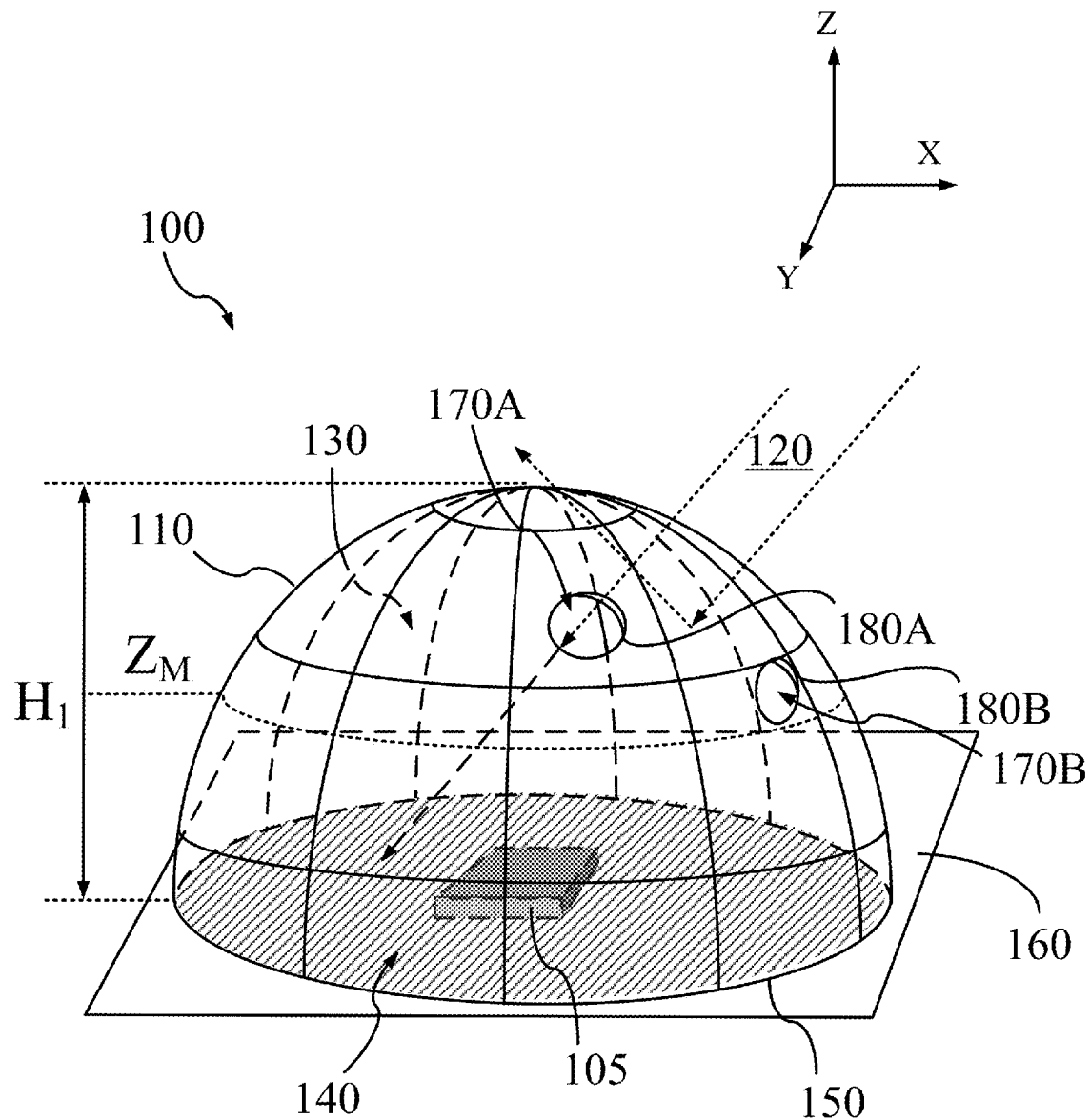
FIG. 2 illustrates a radiation shield having a single wall, according to some embodiments of the present disclosure.

FIG. 2 illustrates a shield 100 having a first wall 110 that may be utilized as a barrier to shield one or more sensors from radiation, according to embodiments of the present disclosure. FIG. 2 illustrates a sensor 105 positioned on a first plane 160 with the first wall 110 positioned over the sensor 105 and at least a portion of the first plane 160. The first plane 160 may be a surface such as a wall or windshield, with the sensor 105 placed on the surface to obtain local environmental measurements; e.g. air and/or surface temperatures. In this example, the first wall 110 of the shield 100 has a substantially ellipsoidal shape with a height, $H_1$, substantially aligned with a longitudinal axis (the Z-axis in FIG. 2), an apex placed at a highest point relative to the longitudinal axis, and a first opening 140 positioned at a lowest point relative to the longitudinal axis. However, the ellipsoidal shape shown in FIG. 2 is for illustrative purposes and any other suitable three-dimensional (3D) shape may be used for a first wall 110, with shapes including spheres, cylinders, cones, pyramids, cuboids, and/or any other shape.

Further, the first opening 140 is defined by a first edge 150 (e.g. rim) such that at least a portion of the first edge 150 may be placed in contact with the first plane 160 or placed substantially close to the first plane 160. The example of a first wall 110 shown in FIG. 2 may be visualized as an inverted, partial ellipsoid, having an opening and rim positioned face-down on a flat surface and over the sensor 105. Thus, FIG. 2 illustrates a first wall 110 with a first opening 140 and/or a first edge 150 positioned substantially in contact with a first plane 160 (e.g. a wall or windshield). In some embodiments of the present disclosure, the first edge 150 of the first wall 110 may be positioned substantially in a reference plane that is parallel to the first plane 160, e.g. with a gap (not shown) between the first edge 150 and the first plane 160. The first opening 140, formed by the first edge 150 may have a substantially two-dimensional (2D) shape, in this case a substantially circular shape. However, the circular shape of the first opening 140 illustrated in FIG. 2 results from the ellipsoid shape of the first wall 110. Thus, the first opening 140 may assume other substantially 2D shapes, which may depend at least partially on the 3D shape chosen for the first wall 110. Examples, of alternative 2D shapes that the first opening 140 may take include shapes that are substantially circles, semicircles, ovals, ellipses, triangles, squares, rectangles, polygons, and/or any other suitable geometric shape.

FIG. 2 illustrates that the 3D shape of the first wall 110 of the shield 100 forms an internal space within the first wall 110, referred to herein as the first space 130. As shown in FIG. 2, a sensor 105 may be positioned on the first plane 160 and within the first space 130 defined by the first wall 110 and the first plane 160, for example to obtain local surface temperature measurements. Thus, the 3D shape of the first wall 110 forms both the first opening 140 that leads from the outside environment into the first space 130 and the first space 130 itself. As a result, the sensor 105 may be at least partially shielded from direct exposure to radiation 120 by placement of the sensor 105 within the first space 130 and under the first wall 110.

However, complete enclosure of the sensor 105 within the first space 130 defined by a first wall 110 may lead to air conditions (e.g. temperature, pressure, humidity) within the first space 130 that inaccurately represent the true air conditions of the environment being investigated. For example, some of the energy from the radiation 120 striking the outside surface of the first wall 110 may be absorbed by the first wall 110 and transferred through the first wall 110, resulting in elevated internal surface temperatures in at least portions of the first wall 110. These elevated surface temperatures may then transfer heat, by conductive, convective, and/or radiant heat transfer, to the air contained within the first space 130 and/or to the first plane 160 (e.g. windshield), thereby inadvertently raising their respective temperatures above the true temperatures of the local environment.

To avoid and/or minimize artificially high and/or low sensor measurements, and to insure that accurate environmental measurements may be obtained from the sensor(s) 105 placed within the first space 130 of a first wall 110, some degree of air exchange between the outside environment and the first space 130 formed by the first wall 110 may be desirable. One way to achieve air exchange between the outside environment and the first space 130 is to provide one or more first apertures (two shown as 170A and 170B) passing through the first wall 110. Thus, a first aperture 170 may be a hole or opening placed within the first wall 110, that allows air to flow by natural and/or forced convection from the environment outside of the first wall 110 into the first space 130. In addition, a first aperture 170 positioned within the first wall 110 may also allow a portion of the radiation 120 to enter the first space 130 and/or directly impinge upon at least a portion of the first plane 160 positioned under the first wall 110. In this manner, the use of a solid first wall 110 to "shade" the sensor 105 from direct exposure to the radiation 120 may be balanced with the use of one or more apertures (170A and 170B) to allow some airflow and/or radiant heat transfer into the first space 130 and/or onto the first plane 160 (e.g. window).

Referring again to FIG. 2, two first apertures (170A and 170B) are defined by second edges (180A and 180B), which, in this example, describe substantially circular 2D shapes. However, one or more shapes may be used, for one or more first apertures 170 passing through the first wall 110, with examples including shapes that are substantially circles, semicircles, ovals, ellipses, triangles, squares, rectangles, polygons, and/or any other suitable geometric shape. In some cases, the second edge 180 of one or more first apertures 170 may intersect with the first edge 150 of the first opening 140 to create a modified first edge (see the examples illustrated in FIGS. 8 and 10) with portions of the first edge positioned substantially outside of the reference plane and/or are not in direct contact with the first plane 160. In other examples, a gap (not shown) may be positioned between the first plane 160 and the first edge 150 of the first wall 110 to allow air exchange between the outside environment and the first space 130.

The relative position of the one or more first apertures (170A and 170B) in the first wall 110 may be selected to optimize the amount of heat transfer occurring between the first space 130 and the environment outside of the first space 130. For example, the first wall 110 may be divided into at least a first portion and a second portion, where the first portion corresponds to a first half of the first shield 110, relative to the height in the Z-axis direction, $H_1$, of the first shield 110, and the second portion corresponds to a second half of the first shield 110. Thus, for this example, the first half of the first shield 110 may start at the apex of the hemispherical first wall 110 of FIG. 2, and end roughly at the midpoint of the height, $H_1$, where the midpoint is designated as $Z_M$ in FIG. 2. The second half of the first shield 110 may then begin roughly at the midpoint $Z_M$ and end at the vertical position (Z-axis direction) of the first opening 140. Thus, as shown in FIG. 2, in some embodiments of a first wall 110, most and/or all of the first apertures 170 may be positioned within the first portion of the first wall 110; e.g. the top half relative to the height, $H_1$. Alternatively, most and/or all of the first apertures 170 may be positioned within the second portion of the first wall 110; e.g. the bottom half relative to the height, $H_1$. Similarly, a first wall 110 may be divided into two or more portions relative to the width of the first wall 110 (in the X-axis direction) and/or the depth of the first wall 110 (in the Y-axis direction), with most or all of the apertures 170 placed in one or more of these portions. Thus, the one or more first apertures 170 may be positioned as needed in the first wall 110, with their specific positions determined by the specific application, environment, and/or measurements desired.

In addition to the shape of a first aperture 170, and its relative position within a first wall 110, the heat transfer occurring between the outside environment and the first space 130 and/or the first plane 160 may be affected by varying the amount of solid surface area occupied, $SA_S$, by the first wall 110 relative to the open surface area, $SA_O$, provided by the one or more first apertures 170. These surface areas may be characterized by determining the total outside surface area of a first wall 110, where the total outside surface area is the sum of the solid surface areas and the open surface areas, $$S_{total} = SA_S + SA_O. \tag{1}$$

Thus, the fraction of the first wall 110 that is open surface area due to the one or more first apertures 170 may be calculated by, $$X_O = SA_O / (SA_O + SA_S). \tag{2}$$

First walls 110 with larger fractions, $x_O$, of open surface area may provide increased convective heat transfer (e.g. increased air flow) between the outside environment and the first space 130 within the first wall 110. However, larger fractions, $x_O$, may also result in insufficient shading of the sensor, and/or over-exposure to direct radiation 120. On the other end of the spectrum, first walls 110 with smaller fractions, $x_O$, of open surface area may not provide sufficient exchange of air between the outside environment and the first space 130 internal to the first wall 110, resulting in undesirable overheating of the first space 130. Thus, it becomes clear that the use of a first wall 110 as a shield to protect a sensor 105 from direct exposure to radiation 120 may require a careful balance of the first aperture 170 positions/locations within the first wall 110, the number of apertures, the size of the apertures, and/or the fraction of the first wall 110 providing open surface area due to the addition of the first apertures 170. In some embodiments of the present disclosure, a first wall 110 may have an open surface area fraction, $x_O$, from about 0.05 to about 0.90. In some embodiments of the present disclosure, a first wall 110 may have an open surface area fraction, $x_O$, from about 0.25 to about 0.50.

Figure 3:
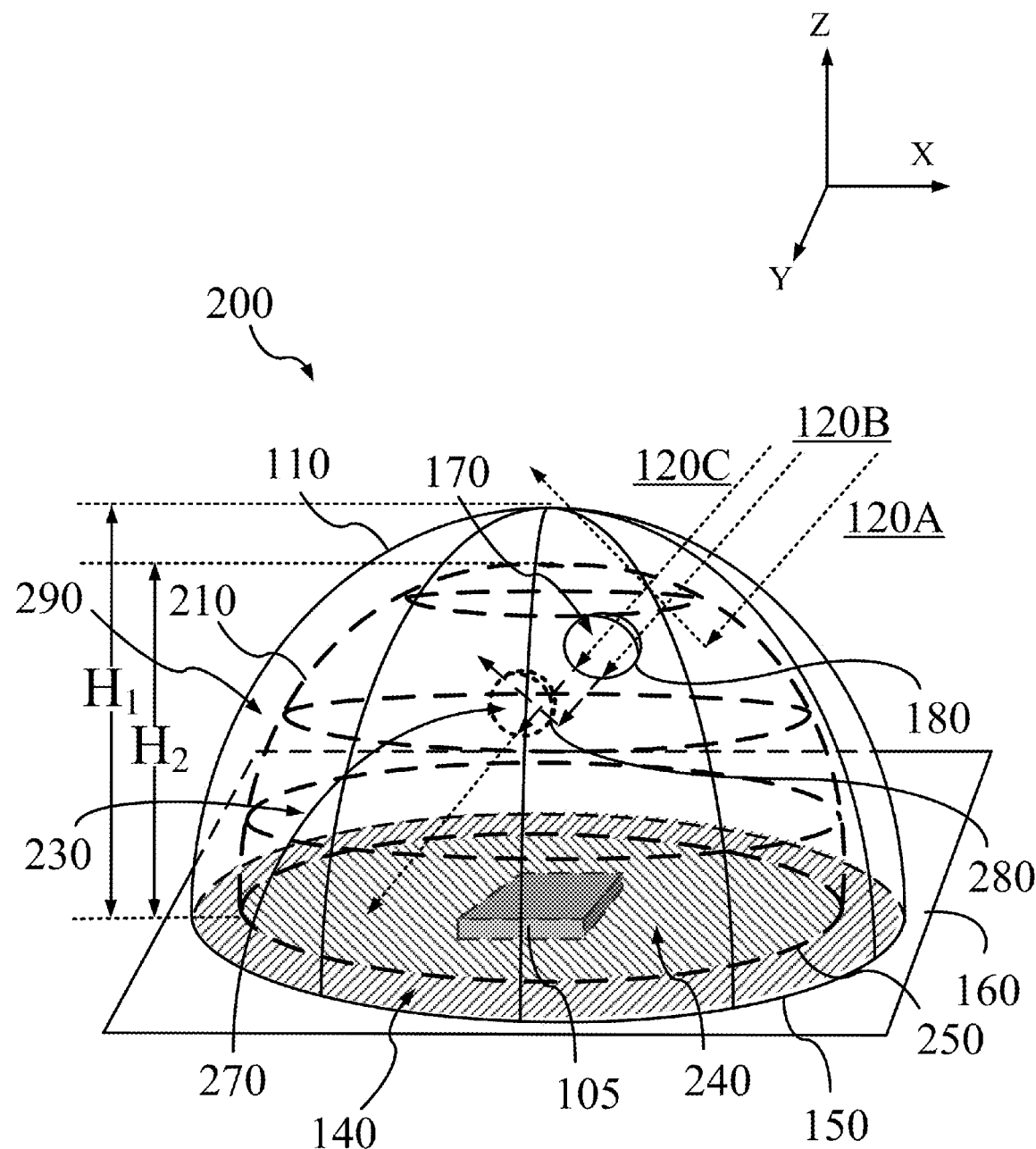
FIG. 3 illustrates a radiation shield have two walls, according to some embodiments of the present disclosure.

However, in some cases even the careful balance of the various design elements described above may be insufficient to adequately isolate a sensor from direct exposure to solar radiation, while simultaneously allowing sufficient exchange of air to minimize effects on the local environment. FIG. 3 illustrates a shield 200 that utilizes a second wall 210 having a second space 230, in addition to a first wall 110. Such a "multi-wall" design provides additional features and elements that enable an improved balance of shielding with ventilation to yield an internal space for the sensor that is more representative of the environment outside of the shield 200.

Thus, FIG. 3 illustrates a shield 200 that includes a second wall 210 positioned within the first space (not referenced) of the first wall 110. The second wall 210 is in a 3D shape that is substantially similar to the 3D shape of the first wall 110, in this example, a substantially hemispherical shape. However, as is the case for the first wall 110, the second wall 210 may have any suitable 3D shape, with examples including spheres, cylinders, cones, pyramids, cuboids, and/or any other geometric shape, partial geometric shape, non-geometric shape, and/or partial non-geometric shape. Thus, placement of the second wall 210 within the first space (see reference no. 130 of FIG. 1) of the first wall 110 requires that the second wall 210 be sized small enough (e.g. height, width, length, etc.) that the second wall 210 fits sufficiently within the first space of the first wall 110. Placement of the second wall 210 within the first space of the first wall 110 results in the formation of an intervening space 290 that separates the inside surface of the first wall 110 from the outside surface of the second wall 210. For shields 200 where the first wall 110 and the second wall 210 are substantially the same 3D shape, the intervening space 290 may define a space with a relatively constant distance between the inside surface of the first wall 110 and the outside surface of the second wall 210. However, the second wall 210 may be in a 3D shape that is significantly different from the 3D shape of the first wall 110. In such cases, the intervening space 290, and the distance between the first wall 110 and the second wall 210 may vary significantly in 3D space. For example, the first wall 110 may be substantially hemispherical in shape, while the second wall 210, placed within the first space of the first wall 110, may be substantially cuboid in shape. For such an example, the intervening space 290 between the first wall 110 and the second wall 210 may have a significantly irregular shape, and the distance between the first wall 110 and the second wall 210 may vary significantly.

FIG. 3 illustrates a sensor 105 positioned on a first plane 160 (e.g. a window) with the first wall 110 and the second wall 210 positioned over the sensor 105 and a portion of the first plane 160. In this example, the second wall 210 has a substantially hemispherical shape with a height, $H_2$, substantially aligned with a longitudinal axis (the Z-axis in FIG. 2), with an apex placed at a highest point relative to the longitudinal axis, and a second opening 240 positioned at a lowest point relative to the longitudinal axis. In this case, the second opening 240 of the second wall 210 is positioned substantially centered within the first opening 140 of the first wall 110. In addition, the second opening 240 is defined by a third edge 250 that is substantially in contact with the first plane 160 (e.g. a wall or window) and/or positioned within a reference plane that is substantially parallel to the first plane 160. Thus, the example of a second wall 210 illustrated in FIG. 3, like the first wall 110 illustrated in FIG. 2, may be visualized as an inverted, hemispherical cup, having an opening and rim positioned face-down on a flat surface. FIG. 3 illustrates the second wall 210 with a second opening 240 defined by a third edge 250 positioned substantially in contact with the first plane 160 (e.g. a wall or windshield). The third edge 250 of the second wall 210 may be positioned substantially in a reference plane (e.g. parallel to the first plane 160, for the case where a gap remains between the third edge and the first plane 160) to form a second opening 240 having a substantially 2D shape, in this case a substantially circular shape.

As is the case for the first opening 140 illustrated in FIG. 3, the second opening 240 illustrated in FIG. 3, may be substantially in the 2D shape of a circle. However, the circular shape of the second opening 240 illustrated in FIG. 3 results from the hemispherical shape of the second wall 210. Thus, the second opening 240, like the first opening 140, may assume other substantially 2D shapes, which may depend at least partially on the 3D shape of the second wall 210. Examples, of alternative 2D shapes that the second opening 240 may take include shapes that are substantially circles, semicircles, ovals, ellipses, triangles, squares, rectangles, polygons, and/or any other suitable geometric shape, partial geometric shape, non-geometric shape, and/or partial non-geometric shape. The shape of the second opening 240 need not be the same as the shape of the first opening 140.

FIG. 3 illustrates a "cup-within-a-cup" configuration, with a second wall 210 placed within a first wall 110, with both edges (150 and 250) of the walls placed substantially in direct contact with the first plane 160 (e.g. a window). FIG. 3 also illustrates that the 3D shape of the second wall 210 forms an internal space within the second wall 210, referred to herein as the second space 230. As shown in FIG. 3, a sensor 105 may be positioned on the first plane 160 and within the second space 230 defined by the second wall 210 and the first plane 160. Thus, the 3D shape of the second wall 210 forms the second opening 240 that leads from the outside environment into the second space 230 and also forms the second space 230 itself. The sensor 105 may then be shielded from direct exposure to radiation 120 by placement of the sensor 105 within the second space 230 of the second wall 210, with the second wall 210 additionally shielded by the first wall 110. However, as stated above, completely enclosing a sensor 105 within a space, e.g. the second space 230 defined by a second wall 210, may lead to air conditions (e.g. temperature, pressure, humidity) within the second space 230 that do not accurately represent the true air conditions of the environment being investigated.

As described above, air exchange between the outside environment and the internal spaces of a shield may be achieved by the placement of apertures within the walls of the shield, thus minimizing environmental discrepancies between the outside environment and the spaces within a shield. In addition, apertures may allow at least some radiation to penetrate into the internal spaces of the shield to impinge upon parts of the surface being evaluated (e.g. wall, window, etc.) Thus, at least one or more second apertures 270 (e.g. a hole or opening) may be placed within the second wall 210, that allow air to flow by natural and/or forced convection from the environment outside of the second wall 210 into the second space 230 formed by the second wall 210. In addition, a second aperture 270 positioned within a second wall 210 may allow a portion of the radiation 120 to enter the second space 230 and/or directly strike at least a portion of the first plane 160 that is positioned under the second wall 210. In this manner, the use of a solid second wall 210 to "shade" the sensor 105 from direct exposure to the radiation 120 and minimize overheating of the second space 230 may be balanced with the use of one or more second apertures 270 to allow some airflow and radiant heat transfer into the second space 230 and/or onto the first plane 160 (e.g. window). In general, the first wall 110 and the second wall 210 are positioned to minimize the impact of the radiation 120 on the first plane 160 that is positioned under the first wall 110 and the second wall 210 to shield the sensor 105 from the radiation 120.

FIG. 3 illustrates a shield 200 having a first wall 110 with a single first aperture 170 placed through the first wall 110, and a second wall 210 with a single second aperture 270 placed through the second wall 210. In some embodiments, a shield 200 may have a first wall 110 having a plurality of first apertures 170, and a second wall having a plurality of second apertures 270. As shown in this example, the first aperture 170 and the second aperture 270 are aligned such that some of the radiation 120A may be reflected off of the outside surface of the first wall 110, while some of the radiation (120B and 120C) may pass through the first aperture 170 of the first wall 110 to enter into the intervening space 290. Finally, some of the radiation 120B may be reflected off of the outside surface of the second wall 210, while a portion of the radiation 120 may pass through the second aperture 270 to enter the second space 230 of the second wall 210 to finally impinge upon a portion of the first plane 160 (e.g. window). Thus, FIG. 3 illustrates that both the relative position of the second wall 210 within the internal space (e.g. the first space 130 of FIG. 1) created by first wall 110, and the position of one or more first apertures 170 within the first wall 110 relative to the position of one or more second aperture 270 within the second wall 210 may affect the amount of air exchanged between the outside environment and the internal spaces and surfaces of the shield 200, as well as the amount of radiation able to reach the portions of the surface (e.g. the first plane 160) covered by the shield 200.

In addition to the radiation from the external environment, a shield system itself will generate radiation that may be transmitted to the underlying sensor, if the shield system is allowed to reach a temperature that is higher than the underlying surface and sensor. The features and elements of the shield systems described herein minimize or eliminate this undesirable overheating of the shield system by minimizing heat build-up by allowing adequate air flow and convective heat-transfer of the heat generated out of the system and to the surrounding environment. In addition, the use of reflective coatings (e.g. on the outer surface of the inner wall) also help to minimize overheating of the shield systems.

Referring again to FIG. 3, the second aperture 270 is defined by a fourth edge 280, in this example, substantially in the shape of a circle. However, one or more shapes may be used, for one or more second apertures 270 positioned within the second wall 210, with examples including shapes that are substantially circles, semicircles, ovals, ellipses, triangles, squares, rectangles, polygons, and/or any other suitable geometric shape, partial geometric shape, non-geometric shape, and/or partial non-geometric shape. In some cases, the fourth edge 280 of one or more second apertures 270 may intersect with the second edge 250 of the second opening 240 to create a modified second edge (see the examples illustrated in FIGS. 8 and 10) with portions of the second edge 250 positioned substantially outside of the reference plane and/or are not in direct contact with the first plane 160. In other examples, a gap (not shown) may be positioned between the first plane 160 and the second edge 250 of the second wall 210 to allow air exchange through the gap, between the outside environment, the second space 230, and/or the intervening space 290.

In addition to the shape of the second aperture 270, and its relative position within the second wall 210, the heat transfer occurring between the outside environment and the second space 230 and/or the first plane 160 may be determined by varying the amount of solid surface area occupied, $SA_S$, by the second wall 210 relative to the open surface area, $SA_O$, provided by the one or more second apertures 270. These surface areas may be characterized by determining the total outside surface area, $S_{total}$, of the second wall 210, where the total outside surface area is the sum of the solid surface areas and the open surface areas, and the fraction of the second wall 210 that is open surface area due to the one or more first apertures are calculated by Equations (1) and (2), respectively.

FIG. 3 illustrates that the combined internal and external surfaces of the first wall 110 and the second wall 210 may be used to regulate how much radiant energy is reflected by the shield 200, absorbed by the shield 200, and/or allowed to penetrate into the internal spaces (230 and 290) of the shield 200. For example, the outer surface of the first wall 110 may be constructed to be highly reflective, for example, by the application of a reflective paint to the outside surface of the first wall 110 and/or by metallizing the outside surface of the first wall 110. Some embodiments of a shield 200 may provide a highly absorptive surface to the interior surfaces of the first wall 110, in order to minimize the amount of radiation that may be reflected off of the interior surface of the first wall 110. Such reflected light, if given sufficient opportunity, may eventually penetrate one of the second apertures 270 and access the second space 230, resulting in overheating of the first plane 160 and/or the sensor 105. Absorptive surfaces may be achieved, for example, with absorptive paints including materials such as carbon black. When targeting reflective surfaces, the surfaces may be treated to yield surfaces that are highly reflective of light having a wavelength of about 200 nm to about 1 mm (solar spectrum 200 nm to 2500 nm and infrared 700 nm to 1 mm). When targeting absorptive surfaces, the surfaces may be treated to yield surfaces that are highly absorptive of light having a wavelength of about 200 nm to about 1 mm.

Thus, some embodiments of the present disclosure may provide a first wall with a highly reflective exterior surface and a highly absorptive interior surface, and a second wall with highly absorptive interior and exterior surfaces. Some embodiments of the present disclosure may provide a first wall with a highly reflective exterior surface and a highly absorptive interior surface, and a second wall with highly reflective exterior surface and a highly absorptive interior surface. Some embodiments of the present disclosure may provide a first wall with a highly reflective exterior surface and a highly absorptive interior surface, and a second wall with highly absorptive exterior surface and a highly reflective interior surface. Some embodiments of the present disclosure may provide a first wall with a highly reflective exterior surface and a highly absorptive interior surface, and a second wall with highly reflective interior and exterior surfaces. Other combinations not specifically described herein also fall within the scope of the present disclosure.

A shield, e.g. the first wall and second wall, may be constructed of any suitable material, with examples include at least one of a metal or a polymer; e.g. thermoplastics such as acrylonitrile styrene acrylate (ASA) and/or acrylonitrile butadiene styrene (ABS).

Thus, a number of elements and variables are available to design a shield effective at shielding a sensor from direct exposure to solar radiation, while simultaneously providing sufficient air exchange and/or allowing some solar radiation to penetrate to the measurement surface to maintain conditions within the shield that match the true environmental conditions. In summary, these elements/variables include at least, for each wall (and a shield may have more than one wall) the following:
1. the 3D shape of the wall and the resultant shape of its interior space;
2. the shape of the opening that connects the interior space of the wall to the outside environment;
3. the interface between the the wall and surface being evaluated (e.g. direct contact or gap);
4. the number, position, and shape of apertures passing through the wall;
5. the amount of open surface area provided by the apertures relative to the total surface area of the wall;
6. the absence or presences of absorptive surfaces and/or reflective surfaces on the walls; and
7. the position of each wall and its elements relative to its neighboring walls and their elements.

Figure 4:
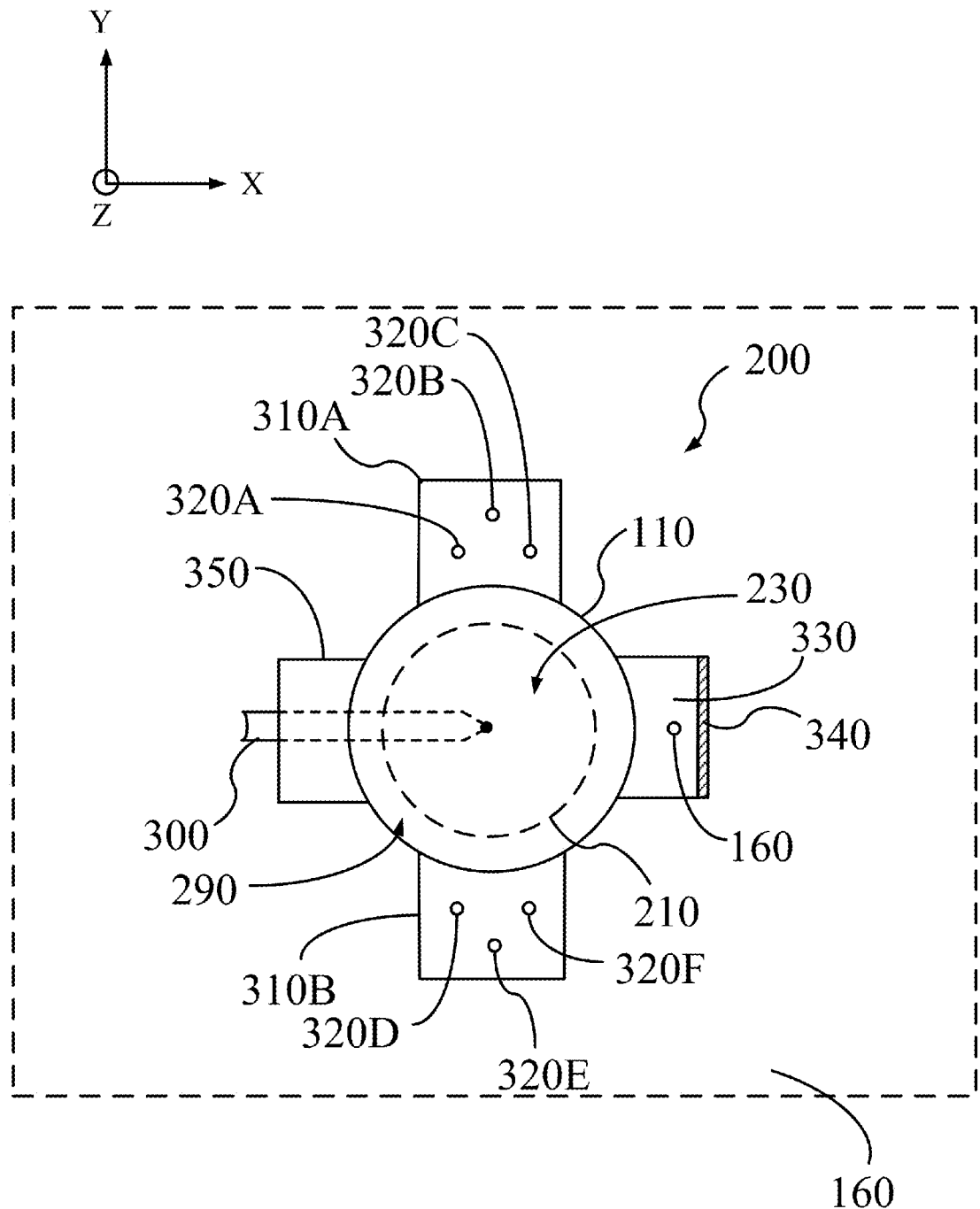
FIG. 4 illustrates a top view of a radiation shield having two walls, according to some embodiments of the present disclosure.

FIG. 4 illustrates a sensor 300 positioned under a shield 200, where the shield 200 includes a hemispherically shaped first wall 110 positioned substantially concentrically over a hemispherically shaped second wall 210. Placement of the first wall 110 over the second wall 210 creates an intervening space 290. The sensor 300 is placed upon a first plane 160 within the space 230 formed by the second wall 210. These features may be modified as needed for a particular application, as described above.

FIG. 4 illustrates some additional features of a shield 200, according to embodiments of the present disclosure. First, the shield 200 illustrated in FIG. 4 demonstrates an embodiment where the first wall 110 and the second wall 210 are constructed from a single piece of material connected by a hinge tab 330 having a flexible hinge 340. The term "tab" refers to a substantially planar piece and/or slab of solid material. A tab may be provided in any desired shape, including at least one of substantially rectangular, square, triangular, and/or circular. Thus, a hinge tab 330 may be a substantially rectangular piece of material having a first end secured to the first wall 110 and a second end secured to the second wall 210. The hinge tab 330 may be sufficiently flexible to bend on itself to position the first wall 110 over the second wall 210, or a hinge 340 may be provided at a midpoint of the hinge tab 330, to enable it to be folded into the desired position.

Second, the bending of the hinge tab 330 may require a locking tab 350 to be positioned opposite to the hinge tab 330 (e.g. along the Z-axis). Thus, the purpose of the locking tab 350 includes holding the first wall 110 in position over the second wall 210. Thus, the first wall 110 may have a locking tab 350 having locking element that interfaces with a receiving locking element located on a corresponding locking tab (not shown) for the second wall 210. Additional details regarding locking mechanisms for a locking tab 350 are provided below. Third, each wall of a shield 200 may include one or more alignment tabs that help guide the first wall 110 into position over the second wall 210. For example, the hinge tab 330 and the locking tab 350 may function in unison to help align the first wall 110 and the second wall 210 relative to the X-axis. Corresponding alignment tabs may assist with the alignment of the two walls (110 and 210) in the Y-axis direction. Thus, each wall may have one or more alignment tabs, such the tabs of the bottom and/or inside wall, e.g. the second wall 210, interface with the corresponding tabs (310A and 310B) of the upper and/or outer wall (first wall 110). The proper alignment of the alignment tabs (310A and 310B) of the first wall 110 with the alignment tabs (not shown) of the second wall 210 may be further aided by the placement of alignment markers (320A-F) on the alignment tabs (310A and 310B) of the first wall 110 that interface with corresponding alignment markers (not shown) on the alignment tabs (not shown) of the second wall 210. For example, alignment markers may include raised surfaces placed on the lower surface of the alignment tabs (310A and 310B) of the first wall 110 that fit into alignment markers (not shown) that include recessed areas on the alignment tabs (not shown) of the second wall 210. Additional features of a shield 200 include one or more holes 160 positioned in one or more tabs to facilitate hanging the shield from a line, and placement of the sensor 300 under one of the tabs, to maintain the sensor's desired position relative to the shield 200 and/or the first plane 160. Finally, application of the shield 200 to the first plane 160 may be facilitated by the use of one or more tabs, for example by the use of an adhesive to the bottom surfaces of the tabs that interface with the first plane 160.

Figure 5A:
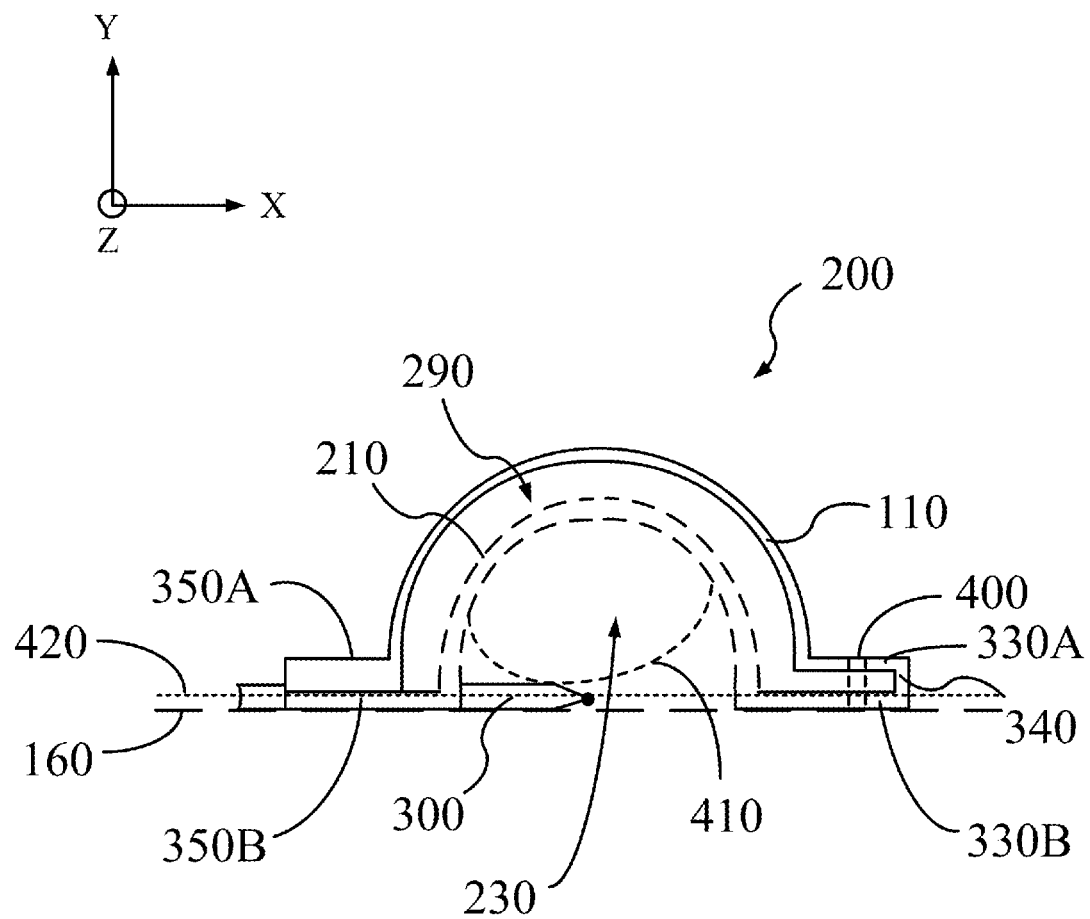
FIG. 5A illustrates a side view of a radiation shield having two walls, according to some embodiments of the present disclosure.

FIG. 5A illustrates a side view of the shield 200 illustrated in FIG. 4, in particular, the folded arrangement of the first wall 110 relative to the second wall 210. The sensor 300 is in physical contact with the first plane 160 (e.g. a window). The sensor 300 is also in contact with one of the tabs of the second wall 210, in this example, the locking tab 350B. Thus, a shield 200 may utilize one of its tabs to align a sensor 300 with the shield 200 and the surface to which the sensor 300 and/or the shield 200 are connected. Further, the two tabs (350B and 330B) of the second wall 210 are both substantially in contact with the first plane 160. The hinge tab 330B of the second wall 210 terminates at a hinge 340 (e.g. thinner portion of material) that connects the hinge tab 330B of the second wall 210 to the hinge tab 330A of the first wall 110. The hinge tab 330A of the first wall 110 then connects to the first wall 210, which also has a locking tab 350 that interfaces with the locking tab 350B of the second wall 210.

FIG. 5A illustrates that in some embodiments of the present disclosure, the tabs (e.g. 350B and 330B) of one wall (e.g. the second wall 210) of a shield may be substantially in contact with a first plane (e.g. 160), while the tabs (e.g. 350A and 330A) of another wall (e.g. the first wall 110) may be substantially in contact with and/or positioned within another plane (e.g. second plane 420). In other words, the tabs of an upper shell of a shield may lie on top of and contact the tabs of a lower shell of the shield. Alternatively, a gap may remain between the opposing tabs of a first wall and a second wall, as illustrated by the gap between the hinge tab 330A and the hinge tab 330B of FIG. 5A. FIG. 5A also illustrates that a push element 410 may be placed within the second space 230 of the second wall 210, such that the push element 410 physically touches at least a portion of the sensor 300, for example, to insure that it is sufficiently in contact with the first plane 160 (e.g. a window). A push element 410 may be any suitable mechanical element having an elastic component, with examples including a spring. For example, a push element may be an integral part of the shield material, forming a cantilevered or other suitable spring type.

Figure 5B:
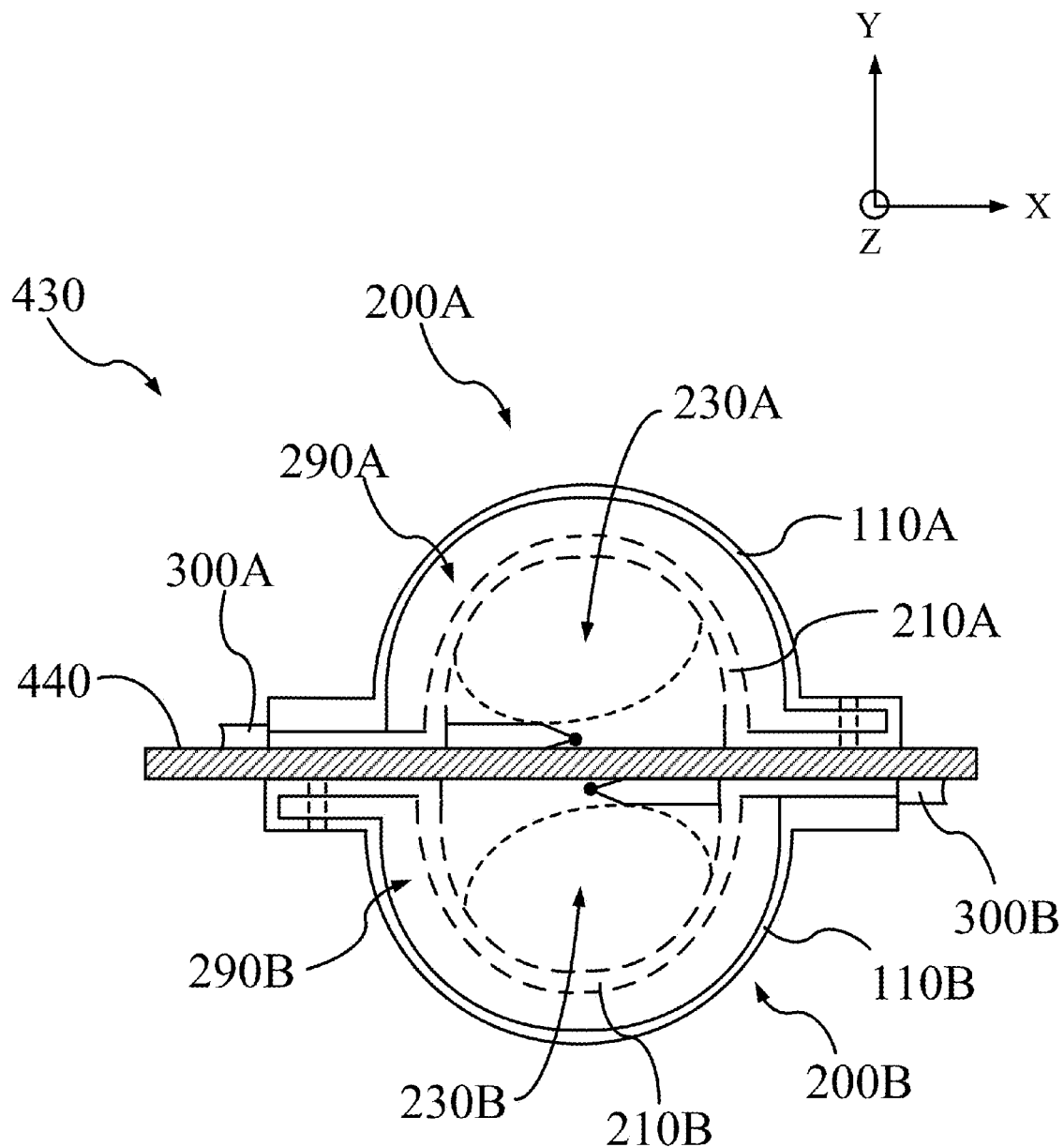
FIG. 5B illustrates a side view of a radiation shield system having a first double-walled radiation shield and a second double-walled radiation shield positioned opposite each other on a surface such as a windshield for obtaining one or more surface temperature, according to some embodiments of the present disclosure.

FIG. 5B illustrates that a shield 200A similar to the one just described may be paired with a second shield 200B to yield a shield system 430. Further, FIG. 5B illustrates an example where two different sensors (300A and 300B) are placed on opposite sides of a substantially planar slab 440, for example a window or windshield. Such an arrangement may enable the simultaneous evaluation of both an inside surface and an outside surface. Or it could be used for either inside or outside surface temperature measurement when shielding is needed to protect from light passing through the back side of a transparent surface. For the case of a transparent window, the combination of a first shield 200A positioned opposite a second shield 200B will create two interior spaces, second space 230a and second space 230b, that are at least partially shielded from radiation.

Figure 6A:
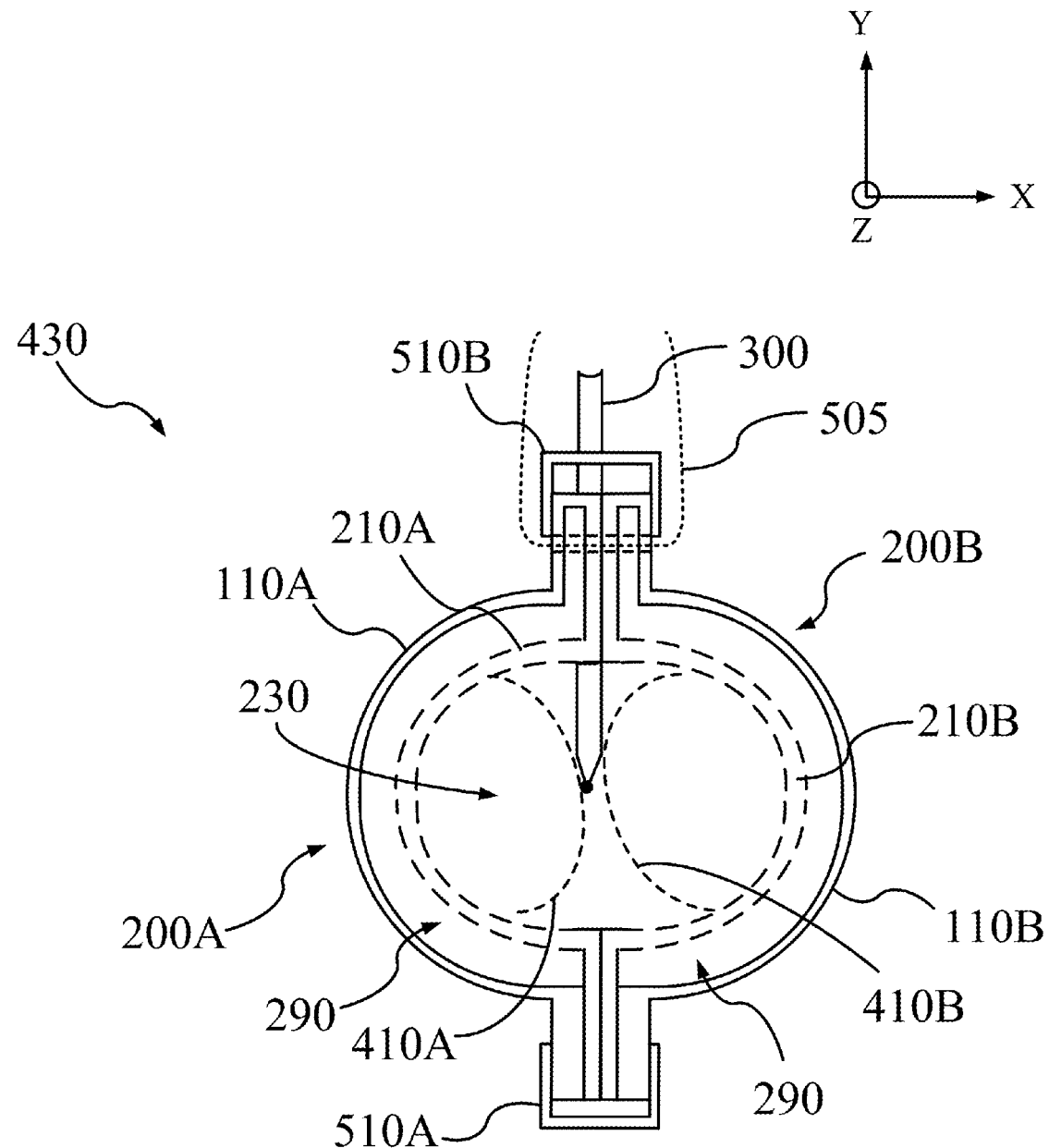
FIG. 6A illustrates a side view of a radiation shield system having a first double-walled radiation shield and a second double-walled radiation shield positioned opposite each other for obtaining an air temperature, according to some embodiments of the present disclosure.

FIG. 6A illustrates an embodiment of a shield system 430 configured to measure an air temperature. In this example, the shield system 430 includes a first shield 200A that is positioned to be in direct contact with a second shield 200B; e.g. there is no intervening material such as a wall or windshield. The tabs of the two adjacent shields (200A and 200B) may be connected such that a single internal space, second space 230, is formed. In addition, connecting the two shields (200A and 200B) may result in the formation of single intervening space, third space 290, between the first walls (110A and 110B) and the second walls (210a and 210b). Thus, connecting the first shield 200A with the second shield 200B may create a second space 230 with a substantially spherical, ellipsoid shape, or any other suitable geometric shape positioned around a sensor 300 for measuring an air temperature. In some cases, the first shield 200A and the second shield 200B may be connected to form the shield system 430 by utilizing one or more clasps (510A and 510B). As shown in FIG. 6A, two clasps are illustrated, with a first clasp 510A connected to a first tab of the shield system, and a second clasp 510B connected to a second tab, positioned opposite the first tab. Two clasps (510A and 510B) are shown for illustrative purposes, and the actual number of clasps utilized will depend on the application.

Thus, as illustrated in FIG. 6A, the shields and shield systems described herein utilized to measure air temperatures, without any intervening window, wall, surface, etc. For example, for air temperature measurements, two shields may be positioned so that the opening of each shield is facing the opening of the other shield such that when the two shields are placed in contact with each other, the temperature sensor is positioned within the resulting internal volume (e.g. spherical volume). In this configuration, the two push elements 410A and 410B (e.g. lever arms) help hold the sensor in position within the center of the formed volume. Clasps (510A and 510B) or any other suitable binding device or method (adhesive, tape, etc) may be used to form an air temperature measurement radiation shield system utilizing the two radiation shields (200A and 200B). The clasps (510A and 510B) attach to the device tabs as shown. Alignment holes positioned on alignment tabs may assist with aligning the two opposing shields. One or more holes positioned in a tab may be used to hang the shield system and sensor in any desired location.

Figure 6B:
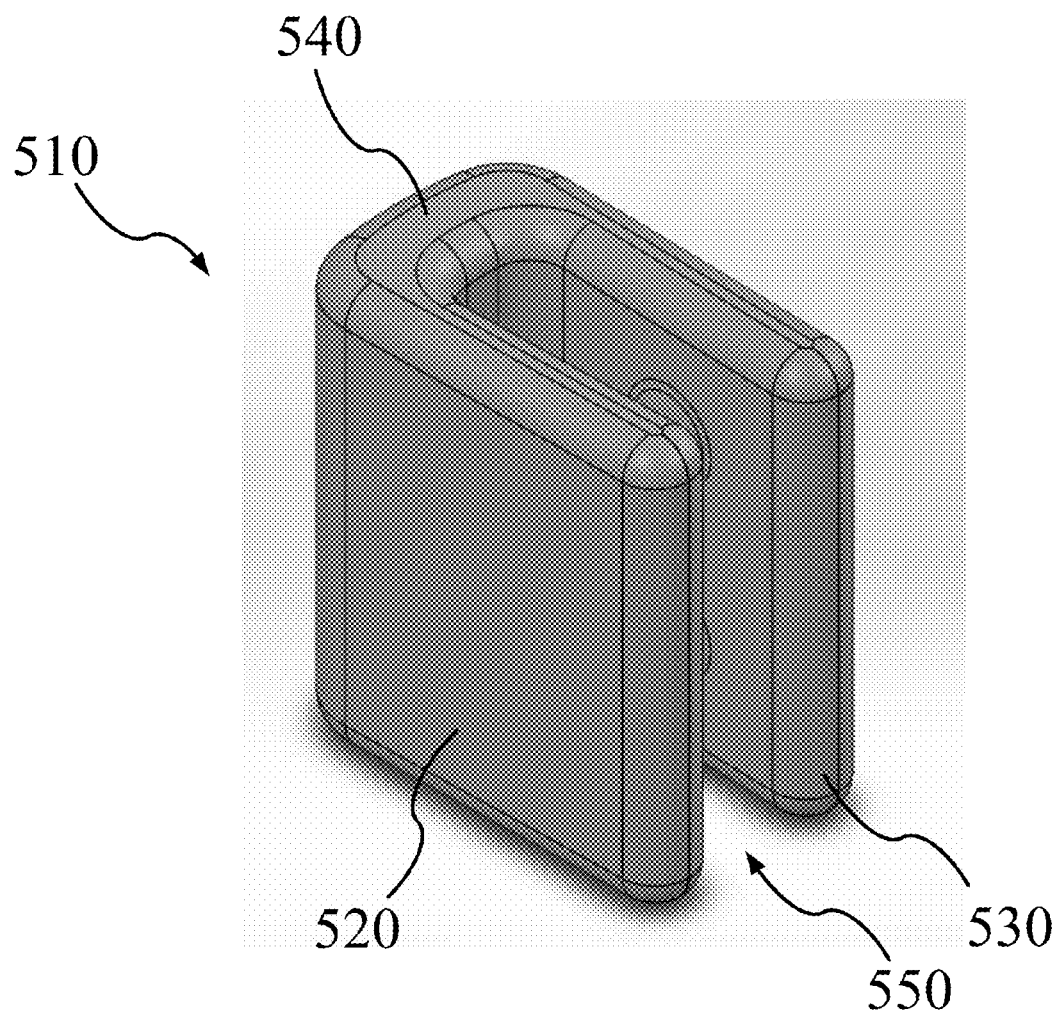
FIG. 6B illustrates a clasp for contacting opposing radiation shields similar to those illustrated in FIG. 6A, according to some embodiments of the present disclosure.
Figure 6C:
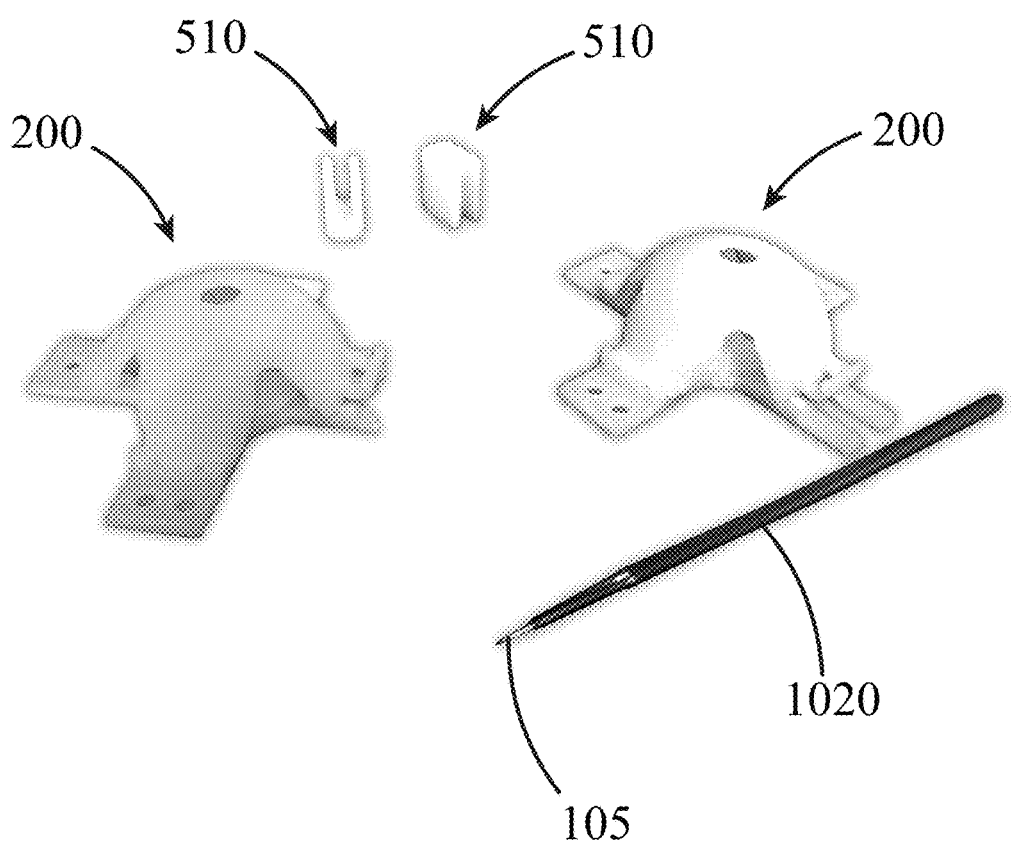
FIGS. 6C-E illustrate some elements of radiation shield systems, according to some embodiments of the present disclosure.
Figure 6D:
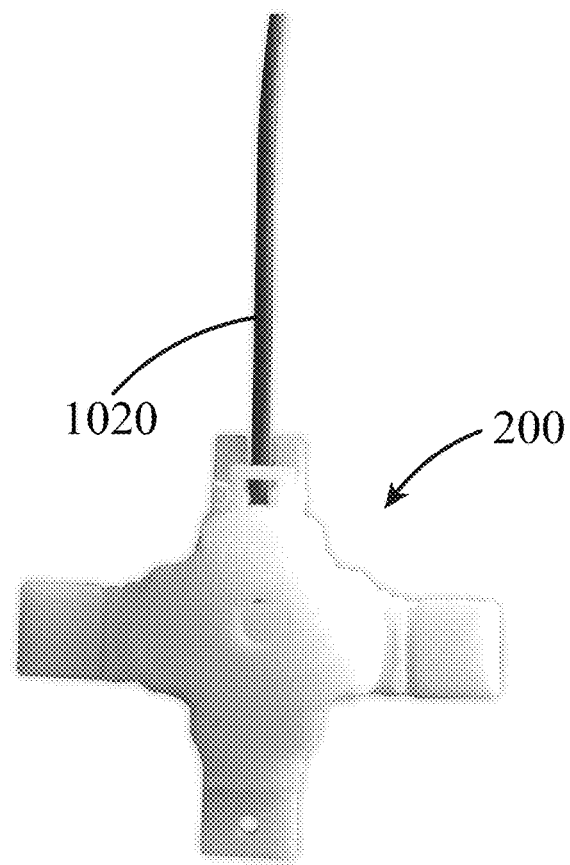
Figure 6E:
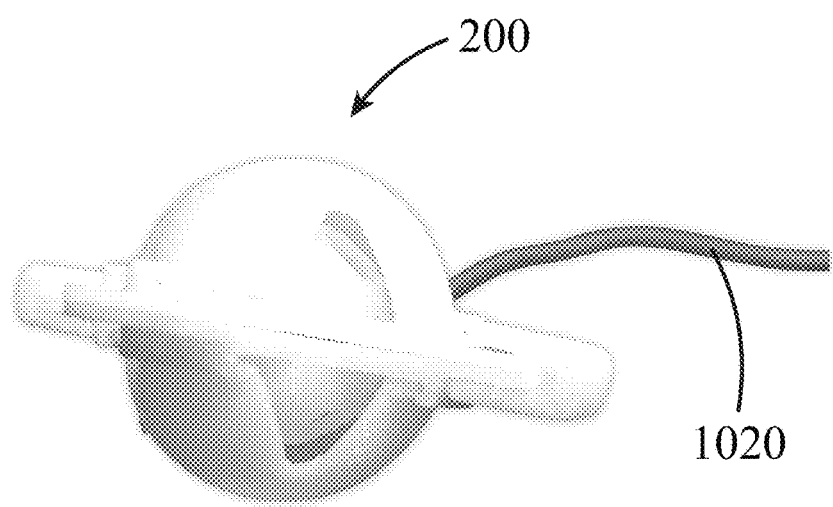

FIG. 6b illustrates and embodiment of a clasp 510. This clasp 510 includes a first side 520 connected to a second side 530 by a connecting element 540. In this embodiment, all three elements (520, 530, and 540) may be described as a wall, plane, or slab of material, such that the clasp 510 contains both rigidity and strength, as well as some flexibility and elasticity that the clasp 510 may be positioned on its respective tab with sufficient clamping and/or compressive force to hold the shields together (as shown in FIG. 6A). Thus, the first side 520 and the second side 520 may be positioned substantially parallel to one another, or slightly offset relative to parallel, to form a gap 550 between the first side 520 and the second side 530. In this fashion, a clasp 510 connect opposing shields by sliding the tabs of the shields into the gap 550, between the first side 520 and the second side 530, such that the compressive force generated by the clasp 520 holds the shield system together. Additional elements may be provided to the inside surfaces of the first side 520 and/or second side 530 to provide friction to prevent the clasp 520 from slipping of its respective shields; e.g. ridges, grooves, and/or any suitable geometric shape in relief. FIGS. 6C-E illustrate images of shield systems incorporating the features described above. FIG. 6C illustrates illustrate two shields, each having a first wall and a second wall, with parabolic-shaped apertures. FIG. 6C also illustrates clasps similar in design to the clasp illustrated in FIG. 6C. FIG. 6D illustrates a shield system utilizing a single shield configured to measure a surface temperature. FIG. 6E illustrates a shield system utilizing a first two-walled shield positioned in contact with a second two-walled shield configured to measure an air temperature.

Figure 7:
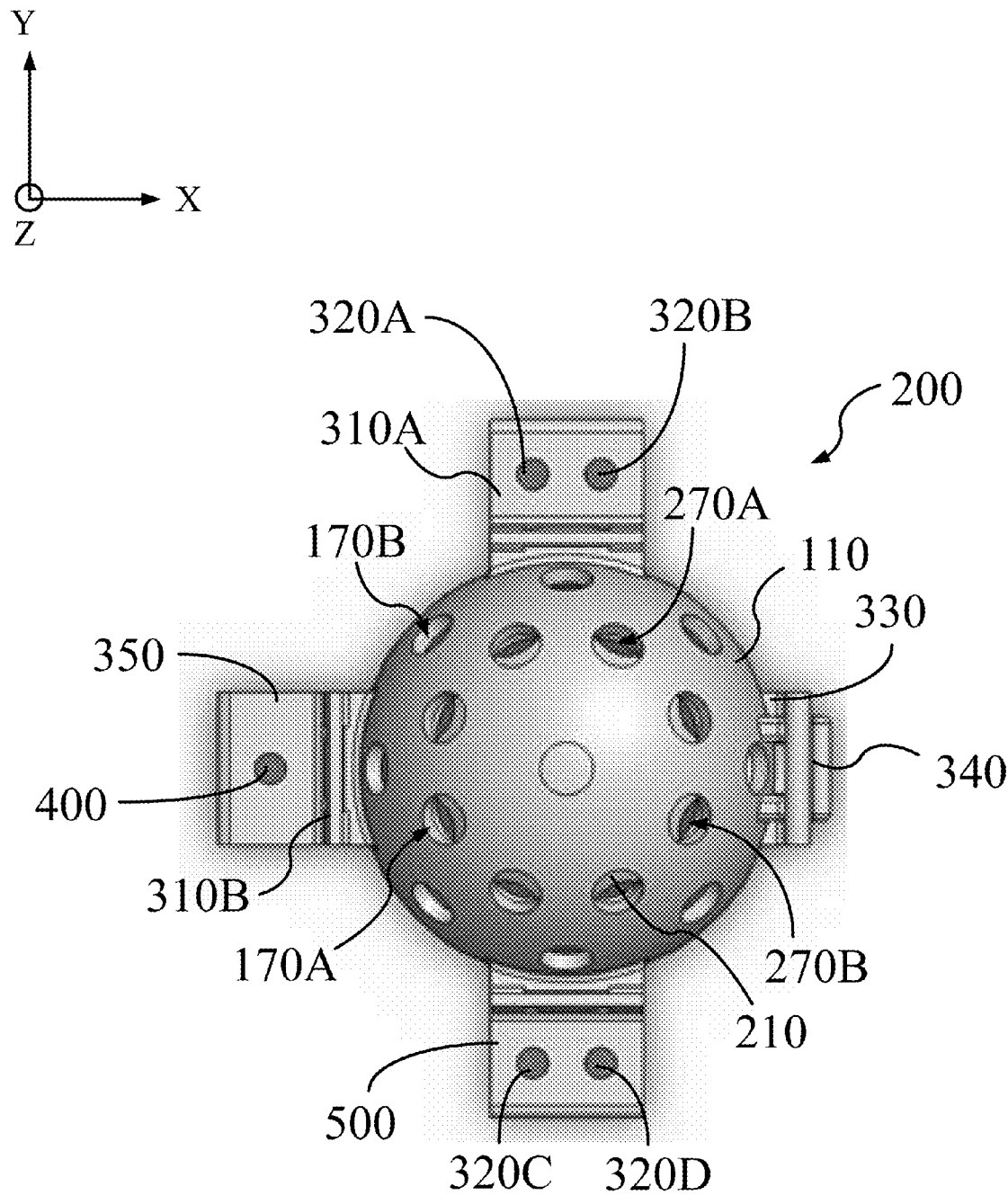
FIG. 7 illustrates a top view of a radiation shield having two walls with a plurality of circular apertures, according to some embodiments of the present disclosure.
Figure 8:
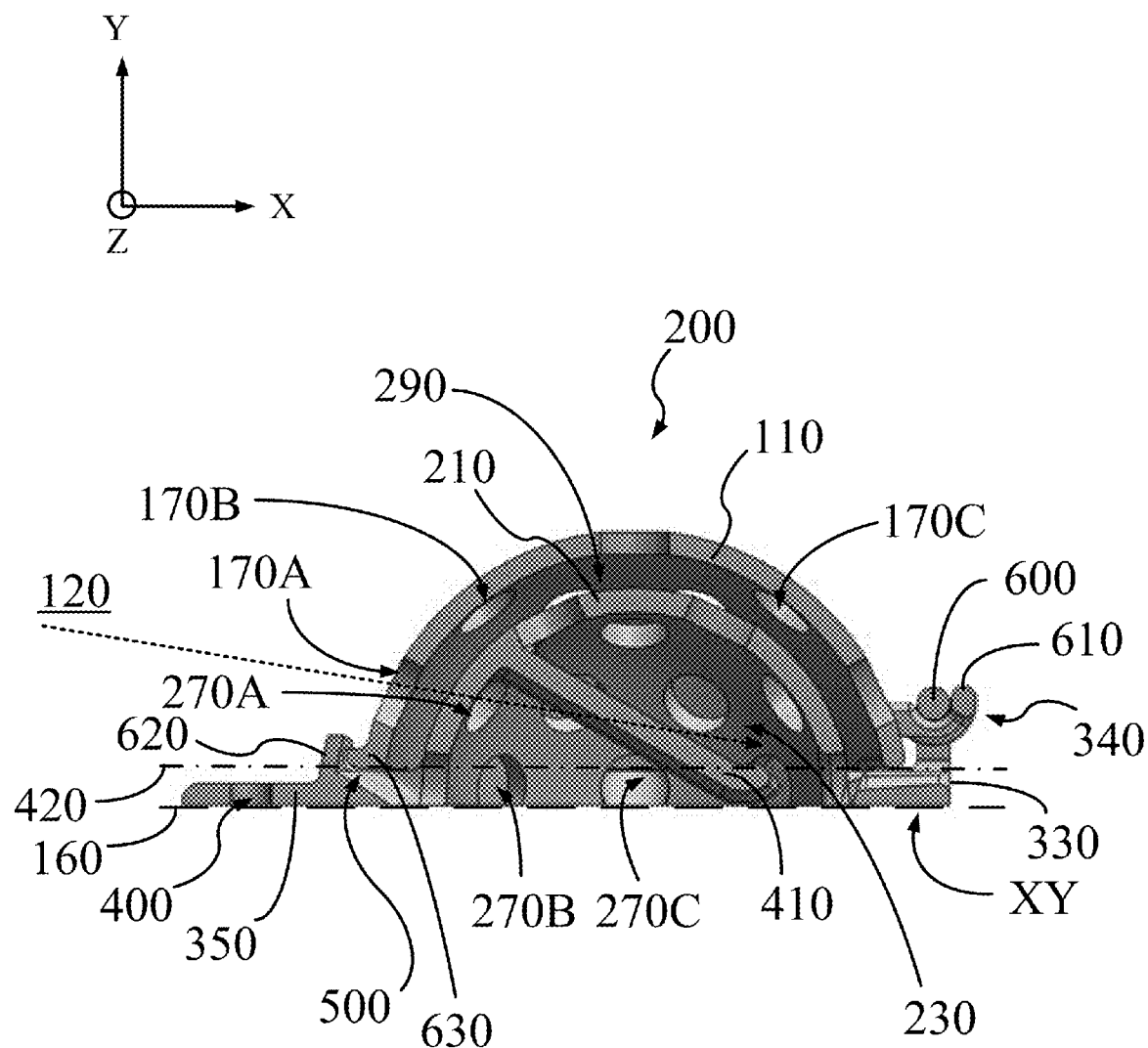
FIG. 8 illustrates a side view of a radiation shield having two walls with a plurality of circular apertures, according to some embodiments of the present disclosure.

FIGS. 7 and 8 illustrate an embodiment of the present disclosure, a shield 200 having a first wall 110 and a second wall 210, where the first wall 110 is positioned substantially concentrically over the second wall 210. The first wall 110 includes a plurality of first apertures 170, where at least some of the first apertures 170 intersect with a second plane 420 substantially containing the first opening (not referenced) of the first wall 110. In addition, the second wall 210 includes a plurality of second apertures 270, where at least some of the second apertures 270 intersect with a first plane 160 substantially containing the second opening (not referenced) of the second wall 210.

FIG. 8 further illustrates additional elements and features of a hinge tab 330 and a locking tab 350. In this example, the second wall 210 has a hinge tab 330 with a rod 600 attached to the hinge tab 330. The rod 600 rotatably engages a clasp 610 that is attached to the first wall 110. The arrangement of the rod 600 to the clasp 610 enables the first wall 110 to reversibly move from the closed position illustrated in FIGS. 5 and 6, to an open position, where the first wall 110 is not positioned over the second wall 210. In addition, the second wall 210 has a locking tab 340 that includes a catch 620 configured to physically engage a lip 630 positioned on a portion of the edge of the first wall 110. The catch 620 may include a substantially rigid piece of material, positioned at a slight angle and configured to accept the lip 630, thus locking the first wall 110 into position around the second wall 210.

Figure 9:
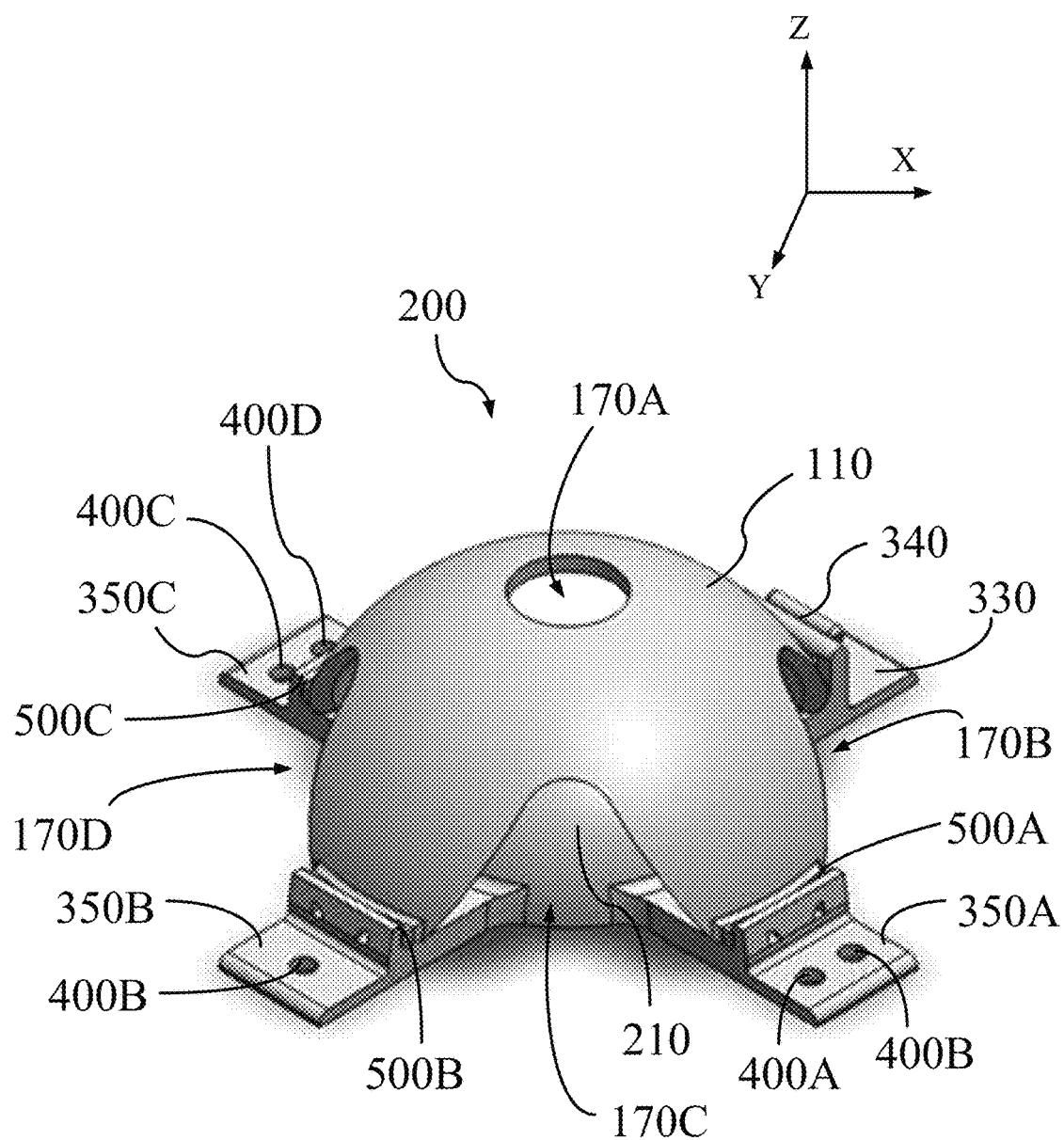
FIG. 9 illustrates a top view of a radiation shield having two walls with a plurality of parabolic-shaped apertures, according to some embodiments of the present disclosure.
Figure 10:
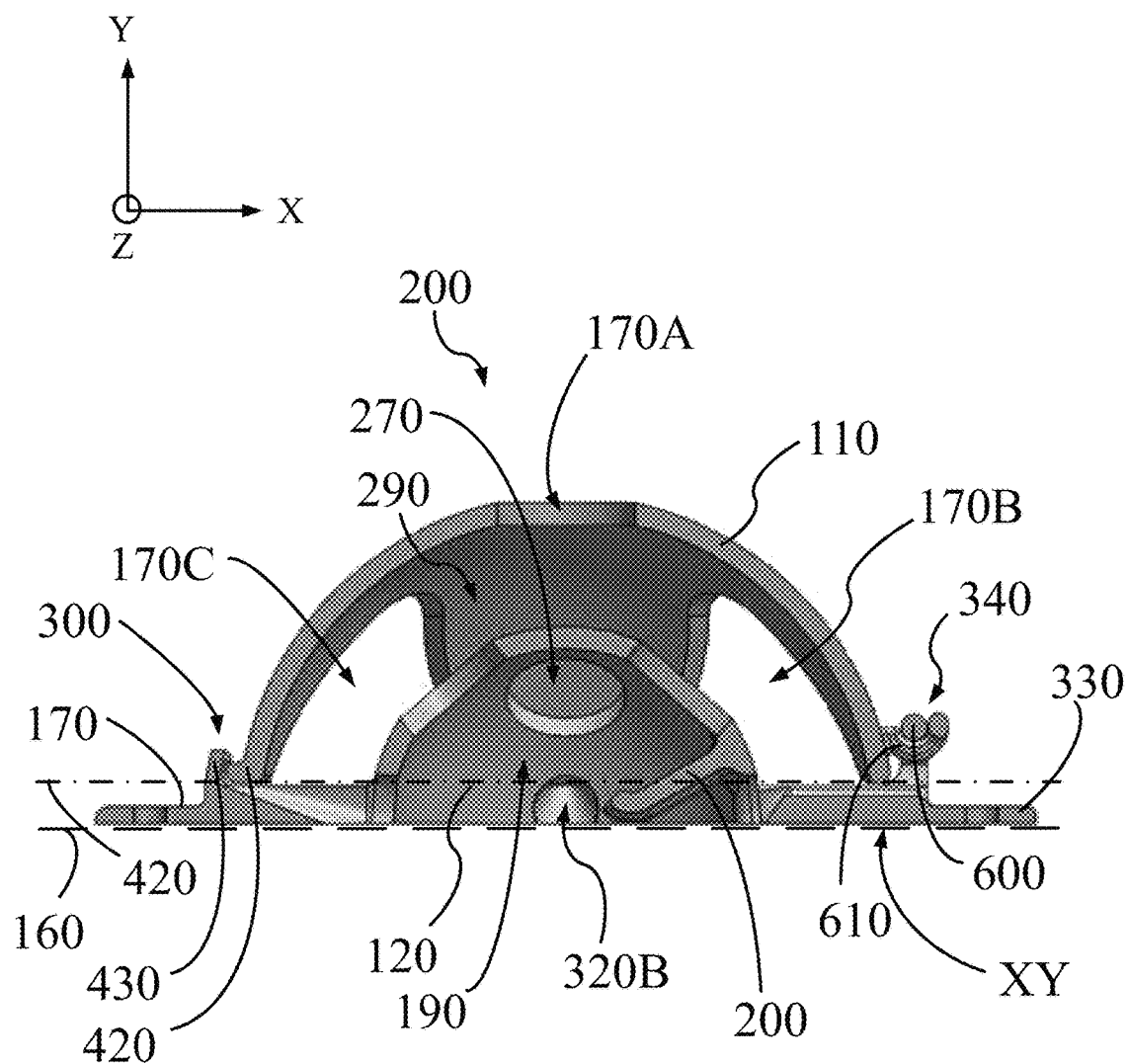
FIG. 10 illustrates a side view of a radiation shield having two walls with a plurality of parabolic-shaped apertures, according to some embodiments of the present disclosure.

FIGS. 9 and 10 illustrate additional embodiments of the present disclosure. First, FIG. 9 illustrates a shield 200 having a first wall 110 positioned concentrically over a second wall 210. In this example, only the second wall 210 has tabs; e.g. locking, alignment, and/or hinge tabs. As in other examples, the second wall 210 of the shield 200 of FIG. 9 has one hinge tab 330. However, the remaining three tabs of the second wall 210 are all locking tabs 350A-C. Referring to FIG. 10, the first wall 110 is "tab-free". Instead, the first wall 110 has a clasp 610 that rotatably engages the rod 600 protruding from the hinge tab 330 connected to the second wall 210. In addition, the first wall 110 includes three lips (only one shown—lip 420), such that each lip engages a corresponding catch 430 positioned on each of the three locking tabs (170A-C) of the second wall 210.

FIGS. 9 and 10 also illustrate a second wall 210 having a plurality of circular second apertures 270. The first wall 110 has a plurality of first apertures 170 with a substantially parabolic shape that intersects the first opening of the first wall. As a result, the first opening of the first wall is described by a relatively complicated edge that is not contained in a single plane.

Figure 11:
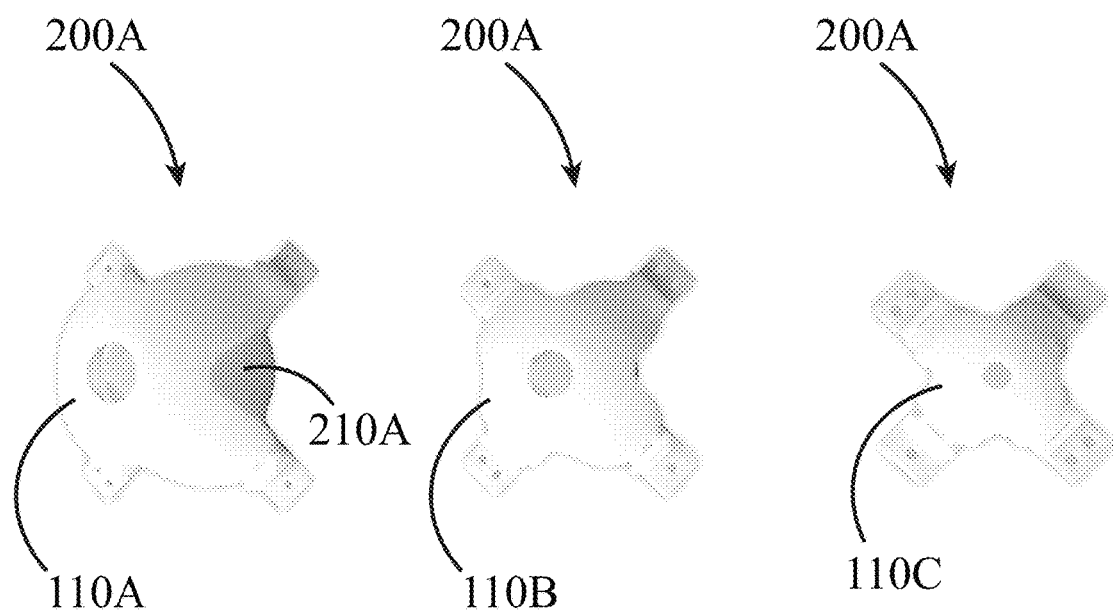
FIG. 11 illustrates examples of radiation shields of different sizes, each having two walls with a plurality of parabolic-shaped apertures, according to some embodiments of the present disclosure.
Figure 12:
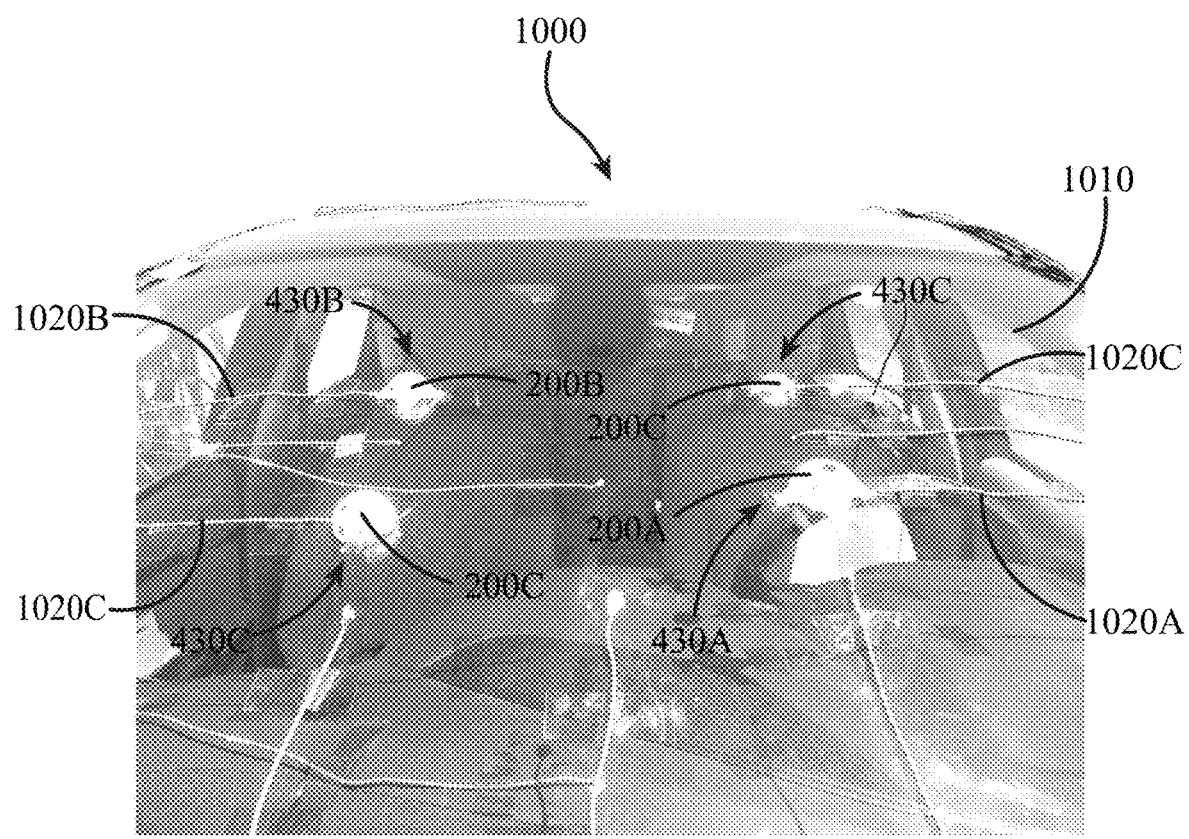
FIG. 12 illustrates a plurality of radiation shield systems installed on the windshield of vehicle, where the shield system are used to obtain a plurality of surface temperature, according to some embodiments of the present disclosure.
Figure 13:
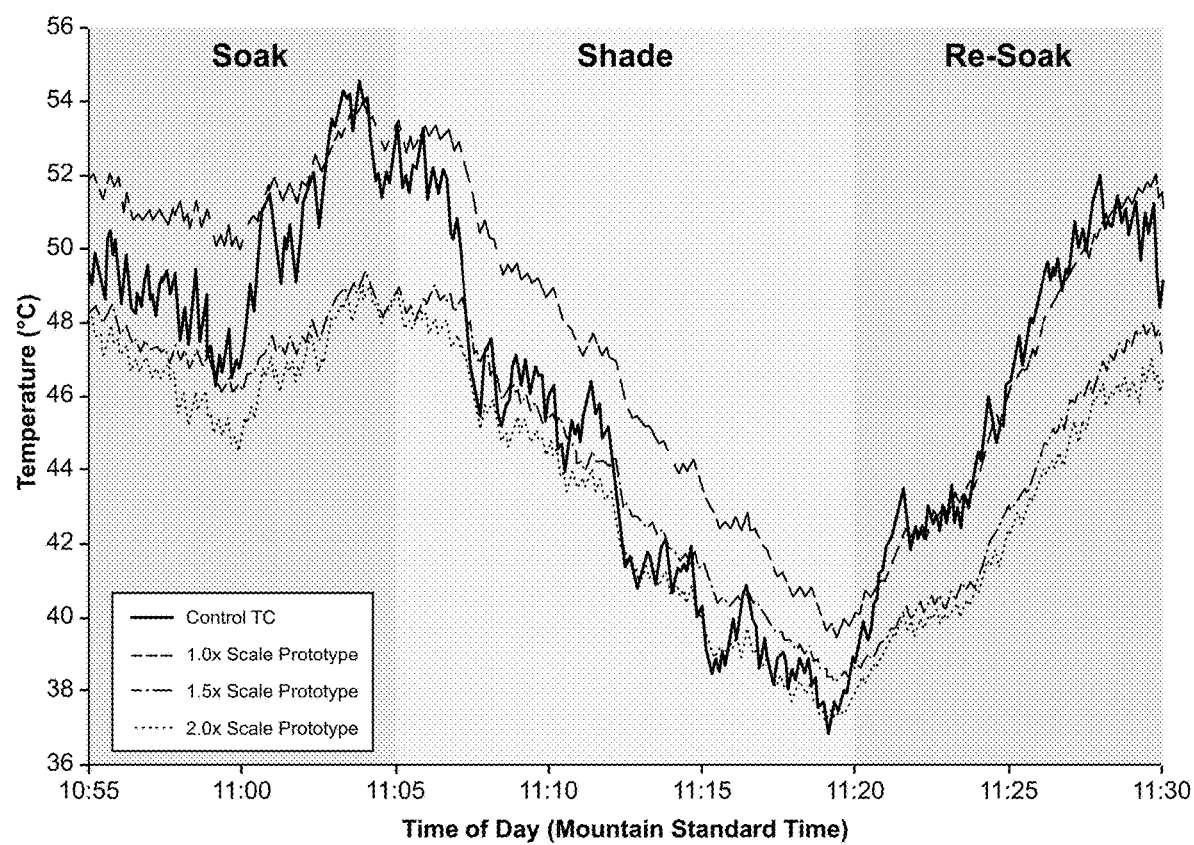
FIG. 13 illustrates experimental data collected from the system illustrated in FIG. 12.

The three radiation shields illustrated in FIG. 11 were printed on a three-dimensional printer and were tested for efficacy during a sunny day outdoors on a vehicle windshield 1010, as shown in FIG. 12. (Alternatively, additive manufacturing may have been used to manufacture the radiation shields.) To measure the error caused by solar loading, a transient shading test was conducted. This test relies on the differences in thermal mass of the sensors and the windshield. Type K thermocouples shielded by radiation shields and unshielded reference thermocouples were mounted to the windshield and allowed to soak in the sunlight, with the temperature measurement results illustrated in FIG. 13; shield references numbers 200A, 200B, and 200C of FIG. 12 correspond to 2×, 1.5×, and 1× respectively of FIG. 13 (corresponding sensor wiring is also shown, 1020A, 1020B, and 1020C, respectively). During this first soak period, a separation of 4-5° C. can be seen between the shielded and unshielded (Control TC) sensors. A shading device consisting of a sheet of rigid foam insulation reflective on the outside facing surface and absorbing on the sensor facing surface was then used to block the solar loading from the sensors. The small mass of the thermocouple sensors quickly equalize to the "true" glass temperature as seen in FIG. 13. For a short duration, the unshielded reference temperature then becomes the glass temperature without solar load error. As expected, the relatively large mass of the glass changes temperature much slower than the sensors when the solar load is removed. Extrapolating windshield temperature backward using a lumped capacitance model, the error can be accurately quantified just before the shade was applied. This shows that the radiation shield designs are effective at eliminating the 4-5° C. error seen on the unshielded thermocouple just before the shading event. It is also worth noting that once the shade is removed in the "Re-Soak" phase, this error quickly returns to the unshielded thermocouples. In FIG. 13, the 1× design (200C) shows poorer performance than the 2× and 1.5× designs. The air flow passages of this 1× design were inadequate causing local heating and less accurate readings; thus, illustrating the need for careful design of each aspect of the shield.

Figure 14:
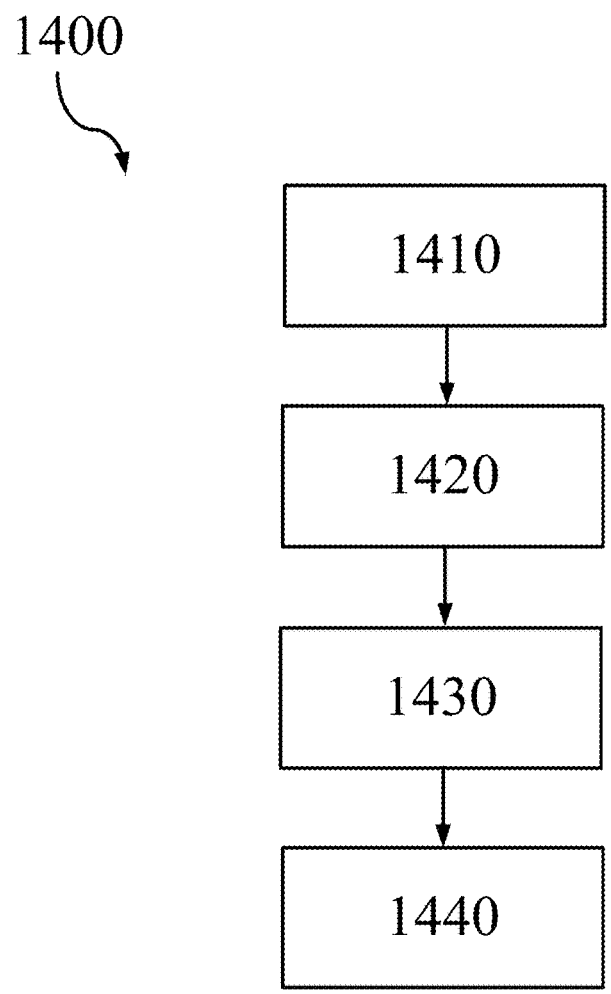
FIG. 14 illustrates a method for installing a radiation shield system, according to some embodiments of the present disclosure.

FIG. 14 illustrates a flow diagram that summarizes a method 1400 for installing a shield system configured to measure at least one surface temperature. In order to use a shield system as described herein for surface measurements, a temperature measuring device such as an exposed junction thermocouple and associated surface location to be measured is identified 1410. The surface is then cleaned 1420 adequately depending on the surface material in order to remove all dirt, debris, film, or any other material that would inhibit bonding of tape or epoxy adhesive to the surface. Next, a first radiation shield is assembled 1430 and the thermocouple is fed through the premade strain relief mechanism of the shield. The thermocouple wire is pulled through the strain relief mechanism until the thermocouple junction is properly positioned 1440 on the shield in the zone targeted for sensor location. Next, a small quantity of conductive epoxy is placed on the thermocouple junction and the thermocouple and shield assembly is firmly pressed onto the target surface. While the epoxy adhesive is curing, the radiation shield is adhered to the surface as well by either bonding the shield to the surface with any suitable material such as an epoxy adhesive or adhesive tape. In some cases, for example in cases where a window is being evaluated, the procedure just described and illustrated in FIG. 14 may be repeated using a second shield and a second thermocouple on the opposite surface of the window. Such an arrangement may provide a first surface temperature measurement for the inside surface of the window, and a second surface temperature measurement for the outside surface of the window, where the first shield and the second shield function together to form a shield system that shields both thermocouples from direct radiation from the sun, as well as from reflected solar radiation from the interior. This kind or arrangement is discussed above in regards to FIG. 5B.

When using the device for air temperature measurement, a temperature measuring device such as an exposed junction thermocouple and associated air volume is identified. One radiation shield is assembled and the thermocouple is fed through the premade strain relief mechanism of the shield. The thermocouple wire is pulled through the strain relief mechanism until the thermocouple junction is properly located on the shield in the zone targeted for sensor location. Next, a second double layer radiation shield is assembled and with the use of locating tabs, placed against the first shield assembly, pinning the thermocouple in the center. Next, premade clips are used to attach the two shield assemblies together and ensure proper alignment. The thermocouple is then hung from a reference object so that it is suspended in the air volume of interest. In addition, a mass can be hung by a wire such as nylon string tied through a premade hole in the center tab of the shield assemblies and provide a counter force to the somewhat stiff thermocouple wire. Adding the mass to the thermocouple assembly ensures that it is properly located in the air volume and if disrupted will properly realign itself.

As used herein, the term "substantially" refers to the inherent variability present in attempts to attain an exact design parameter. For example, when attempting to position a first plane vertically (e.g. at 90.0°) relative to a second plane, there will be some inherent error in the final, true position of the first plane relative to the second plane; e.g. ±0.1°, or ±1.0°, or ±1.0°, etc. The actual error will depend on the specific situation. Similarly, when providing a circular aperture The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A device for shielding a temperature measuring element from direct exposure to radiation, the device comprising:
a first wall comprising a first opening having a first edge; and
a first aperture through the first wall, wherein:
the first edge is positioned at least partially within a first plane,
the first wall and the first plane define a first space positioned within the first wall,
the first aperture has a second edge with at least a portion of the second edge positioned outside of the first plane, and
the space is configured to contain the temperature measuring element.

2. The device of claim 1, further comprising:
a second wall comprising a second opening having a third edge; and
a second aperture through the second wall, wherein:
the third edge is positioned at least partially within the first plane or within a second plane substantially parallel to the first plane,
the second wall and the first plane or the second plane define a second space positioned within the second wall,
the second wall is positioned within the first space to form a third space between the first wall and the second wall,
the second aperture has a fourth edge with at least a portion of the fourth edge positioned outside of at least one of the first plane or the second plane, and
the first aperture and the second aperture are positioned to minimize the transfer of the radiation into the second space.

3. The device of claim 2, wherein the second wall is substantially in a shape comprising a hemisphere, an ellipsoid, a cone, or a pyramid.

4. The device of claim 2, wherein the second opening is substantially in a shape comprising a circle, a semicircle, an oval, an ellipse, a triangle, a square, a rectangle, or a polygon.

5. The device of claim 2, wherein the second aperture is substantially in a shape comprising at least one of at least a portion of a circle, a semicircle, an oval, an ellipse, a triangle, a square, a rectangle, a parabolic shape, or a polygon.

6. The device of claim 5, wherein the second edge intersects the first plane.

7. The device of claim 2, wherein the third edge intersects at least one of the first plane or the second plane.

8. The device of claim 2, wherein the second wall has a second outer surface comprising a third material that substantially reflects radiation.

9. The device of claim 8, wherein the second wall has a second inner surface comprising a fourth material that substantially absorbs radiation comprising a wavelength from about 700 nm to about 1 mm.

10. The device of claim 9, wherein at least one of the third material or fourth material substantially absorbs or reflects radiation comprising at least one of visible light or infrared light.

11. The device of claim 2, wherein:
the second wall has a second total surface area,
the second aperture has a second open surface area, and
a second ratio is defined by the second open surface area divided by the second total surface area.

12. The device of claim 2, wherein:
the first aperture is positioned in a second portion of the second wall relative to the axis perpendicular to the first plane, and
the second portion is positioned below the first height relative to the first plane.

13. The device of claim 1, wherein the first wall is substantially in a shape comprising a hemisphere, an ellipsoid, a cone, or a pyramid.

14. The device of claim 1, wherein the first opening is substantially in a shape comprising a circle, a semicircle, an oval, an ellipse, a triangle, a square, a rectangle, or a polygon.

15. The device of claim 1, wherein the first aperture is substantially in a shape comprising at least one of at least a portion of a circle, a semicircle, an oval, an ellipse, a triangle, a square, a rectangle, a parabolic shape, or a polygon.

16. The device of claim 1, wherein the first wall has a first outer surface comprising a first material that substantially reflects radiation.

17. The device of claim 16, wherein the first wall has a first inner surface comprising a second material that substantially absorbs radiation.

18. The device of claim 17, wherein at least one of the first material or second material substantially absorbs or reflects radiation comprising a wavelength of about 200 nm to about 2500 nm.

19. The device of claim 1, wherein:
the first wall has a first total surface area,
the first aperture has a first open surface area, and
a first ratio is defined by the first open surface area divided by the first total surface area.

20. The device of claim 1, wherein:
the first aperture is positioned in a first portion of the first wall relative to an axis perpendicular to the first plane, and
the first portion does not exceed a first height relative to the first plane.

21. A method comprising:
forming an internal volume by positioning an outer wall around an inner wall;
controlling radiant heat transfer into the internal volume;
minimizing reflection of radiation within the internal volume; and
controlling convective heat transfer between the internal volume and an external environment, wherein:

the controlling radiant heat transfer; and the controlling convective heat transfer is accomplished by varying at least one of the number, shape, or position of a plurality of apertures positioned with the outer wall and the inner wall,
the minimizing reflection of radiation is performed by providing a light-absorbing coating to an inside surface of at least one of the outer wall or the inner wall, and
the controlling of radiant heat transfer is controlled by providing a light-reflective coating to an outside surface of at least one of the inner wall or the outer wall.

* * * * *